United States Patent
Jung et al.

(10) Patent No.: US 10,707,690 B2
(45) Date of Patent: Jul. 7, 2020

(54) ELECTRONIC DEVICE FOR PERFORMING CHARGING AND METHOD FOR CONTROLLING THE SAME

(71) Applicant: Samsung Electronics Co., Ltd., Suwon-si, Gyeonggi-do (KR)

(72) Inventors: Ji-Hoon Jung, Seoul (KR); Bong-Chul Kim, Seoul (KR); Pradipta Patra, Suwon-si (KR); Ki-Young Kim, Yongin-si (KR); Yun-Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 15/717,347

(22) Filed: Sep. 27, 2017

(65) Prior Publication Data
US 2018/0102663 A1 Apr. 12, 2018

(30) Foreign Application Priority Data
Oct. 6, 2016 (KR) .................... 10-2016-0129362

(51) Int. Cl.
*H02J 7/00* (2006.01)
*H02J 7/04* (2006.01)
*H02M 3/335* (2006.01)

(52) U.S. Cl.
CPC ............. *H02J 7/0072* (2013.01); *H02J 7/00* (2013.01); *H02J 7/0042* (2013.01); *H02J 7/042* (2013.01); *H02M 3/33507* (2013.01); *H02J 7/00034* (2020.01); *H02J 2207/20* (2020.01); *H02J 2207/40* (2020.01)

(58) Field of Classification Search
USPC .......................................................... 320/107
See application file for complete search history.

(56) References Cited

U.S. PATENT DOCUMENTS

| 2011/0018679 A1 | 1/2011 | Davis et al. |
| 2011/0269513 A1 | 11/2011 | Lin et al. |
| 2012/0112705 A1 | 5/2012 | Wang et al. |

(Continued)

FOREIGN PATENT DOCUMENTS

| CN | 105826961 A | 8/2016 |
| EP | 2 944 010 B1 | 4/2019 |

(Continued)

OTHER PUBLICATIONS

European Search Report dated Jun. 12, 2019, issued in European Application No. 17858674.9-1202.

(Continued)

*Primary Examiner* — Samuel Berhanu
(74) *Attorney, Agent, or Firm* — Jefferson IP Law, LLP

(57) ABSTRACT

An electronic device for charging a battery is provided. The electronic device includes a first path configured to receive a first power of a first voltage from an adapter, a second path configured to receive a second power of a second voltage from the adapter, a charger, connected to the first path, configured to receive the first power, adjust at least one of a voltage or a current of the first power, and provide the adjusted first power to the battery; and a processor configured to control to connect the second path to the battery during fast charging to directly connect the battery to the adapter.

12 Claims, 24 Drawing Sheets

(56) References Cited

U.S. PATENT DOCUMENTS

| | | |
|---|---|---|
| 2013/0241469 A1 | 9/2013 | Ono et al. |
| 2016/0020620 A1 | 1/2016 | Lee et al. |
| 2017/0133862 A1* | 5/2017 | Jung ................ H01M 10/4257 |
| 2017/0237864 A1 | 8/2017 | Zhang et al. |

FOREIGN PATENT DOCUMENTS

| | | |
|---|---|---|
| JP | 2011-233129 A | 11/2011 |
| JP | 2013-198262 A | 9/2013 |
| KR | 10-2005-0023032 A | 3/2005 |
| KR | 10-1507954 B1 | 4/2015 |
| KR | 10-2015-0098034 A | 8/2015 |
| KR | 10-2016-0033523 A | 3/2016 |
| WO | 2015/096743 A1 | 7/2015 |
| WO | 2016/058426 A1 | 4/2016 |

OTHER PUBLICATIONS

International Search Report dated Jan. 11, 2018, issued in the International Application No. PCT/KR2017/010730.

* cited by examiner

ELECTRONIC DEVICE FOR PERFORMING CHARGING AND METHOD FOR CONTROLLING THE SAME

CROSS-REFERENCE TO RELATED APPLICATION(S)

This application claims the benefit under 35 U.S.C. § 119(a) of a Korean patent application filed on Oct. 6, 2016 in the Korean Intellectual Property Office and assigned Serial number 10-2016-0129362, the entire disclosure of which is hereby incorporated by reference.

TECHNICAL FIELD

The present disclosure relates to an electronic device for performing charging and a method for controlling the electronic device. More particularly, the present disclosure relates to an electronic device for charging an internal battery or an adapter for delivering power to the electronic device and a method for controlling the electronic device or the adapter.

BACKGROUND

Recently, electronic devices manufactured to have small sizes for portability have been widely spread. Although being manufactured to have small sizes, the electronic devices include much high-performance hardware to perform various operations. As a result, early discharging of a battery of the electronic device has been called into question. For example, a user has to frequently charge the electronic device or has to carry an auxiliary battery.

To solve the foregoing problem, fast charging has been developed. Fast charging may mean a method for charging a battery within a relatively short time by applying higher current to the battery than in normal charging.

For fast charging, relatively high current may be applied to a charger for charging the battery. In this case, heat generated in the charger may increase, thus increasing the overall temperature of the electronic device. The increase in the overall temperature of the electronic device may deteriorate the charger or other hardware, lowering the charging efficiency of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for controlling the same, in which a battery is charged by a plurality of chargers or using methods other than the charger, thereby reducing a heat emission quantity of the charger.

In accordance with an aspect of the present disclosure, the electronic device includes a first path configured to receive a first power of a first voltage from an adapter, a second path configured to receive a second power of a second voltage from the adapter, a charger, connected to the first path, configured to receive the first power, adjust at least one of a voltage or a current of the first power, and provide the adjusted first power to the battery; and a processor configured to control to connect the second path to the battery during fast charging to directly connect the battery to the adapter.

In accordance with an aspect of the present disclosure, an adapter for providing power to an electronic device that charges a battery, includes a transformer configured to transform input power, a first path, connected to the transformer, configured to receive a first power of a first voltage from the adapter, a charger, connected to the transformer, configured to adjust the transformed power provided from the adapter to a second power of a second voltage, and output the second power of the second voltage, and a second path configured to receive the second power from the charger. During fast charging, the first path is connected to the charger of the electronic device and the second path is directly connected to the battery of the electronic device.

In accordance with an aspect of the present disclosure, an electronic device for charging a battery, includes a first charger configured to receive power from an external power source, a second charger configured to receive power from the external power source, and a processor configured to control to determine an overall level of a current for charging the battery, to control to determine a first level of a first current corresponding to the first charger and a second level of a second current corresponding to the second charger to charge the battery with optimal efficiency, to control the first charger to receive the first current of the first level, and to control the second charger to receive the second current of the second level.

In accordance with an aspect of the present disclosure a transformer for transforming a voltage of a power, includes a first power source configured to provide a power of a direct current (DC) waveform, a primary side coil and a secondary side coil configured to transform the power, a third switch configured to perform on/off operations to provide a power of an alternating current (AC) power to the primary side coil, a second switch, and a first switch. A drain of the second switch is connected to a gate of the third switch and a source of the second switch is connected to a source of the third switch. A drain of the first switch is connected to a source of the third switch and the source of the second switch and a source of the first switch is connected to a ground.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
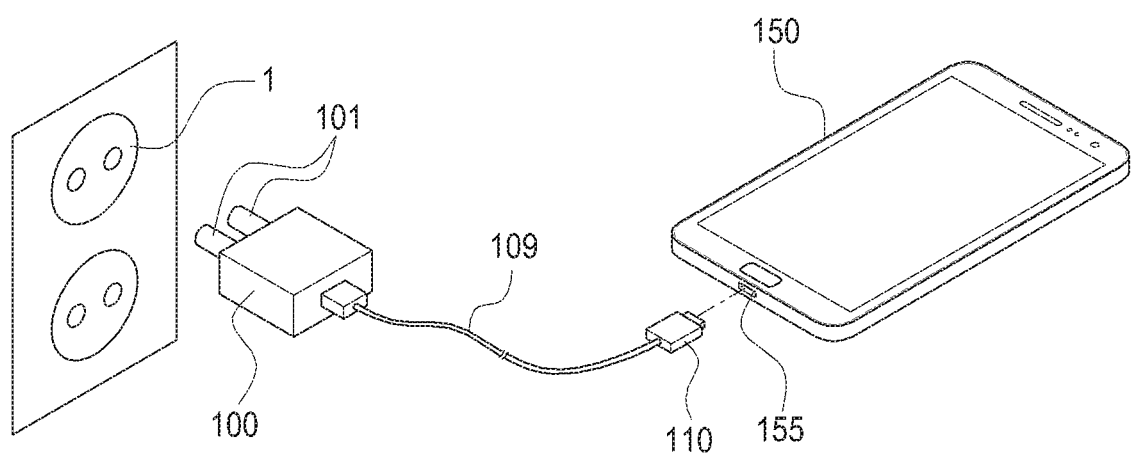
FIG. 1A is a conceptual view for describing an adapter and an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console (e.g., Xbox™ or PlayStation™), an electronic dictionary, an electronic key, a camcorder, or an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), or Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device (e.g., an artificial intelligence electronic device).

FIG. 1A is a conceptual view for describing an adapter and an electronic device according to various embodiments of the present disclosure. As shown in FIG. 1A, an adapter 100 may include a plug 101 connectable to an electric outlet 1. The plug 101 may be implemented in a form corresponding to a defined voltage and may receive power from an external power source through the outlet 1. The adapter 100 down-converts the power received through the plug 101 and delivers the down-converted power to an electronic device 150. The adapter 100 lowers a level of the received power to a preset level and also performs rectification. For example, if the power received from the outlet 1 is an alternating current (AC) of a voltage of 220V, the adapter 100 may output a direct current (DC) power of 5V. The adapter 100 may include a connector 110 for connection with the electronic device 150. The connector 110 according to various embodiments of the present disclosure may include a connection terminal defined in a universal serial bus (USB). The electronic device 150 may further include a port 155 connectable with the connector 110.

The adapter 100 according to various embodiments of the present disclosure may deliver power to the electronic device 150 through a plurality of paths. In a cable 109, a plurality of paths for power transmission may be included. For example, if the adapter 100 includes the cable 109 and the connector 110 defined in the USB, the adapter 100 may provide power to the electronic device 150 through a lane (e.g., a data lane, etc.) for a purpose other than a power transmission lane defined in the USB. Herein, the lane may also be referred to as a line. In this case, a voltage of the power in each of the plurality of routes may be different or identical. At least one of the plurality of paths may be connected to the charger in the electronic device 150, and other paths of the plurality of paths may be directly connected to a battery of the electronic device 150. For a path-specific connection structure, a more detailed description will be made with reference to FIG. 1B.

As stated above, at least one of the plurality of paths may be connected to the charger in the electronic device 150 and other paths of the plurality of paths may be directly connected to the battery without passing through the charger in the electronic device 150 to provide power. Thus, a large current may be applied to the battery without applying an excessive current to the charger of the electronic device 150, making fast charging possible without heat emission of the charger.

Figure 1B:
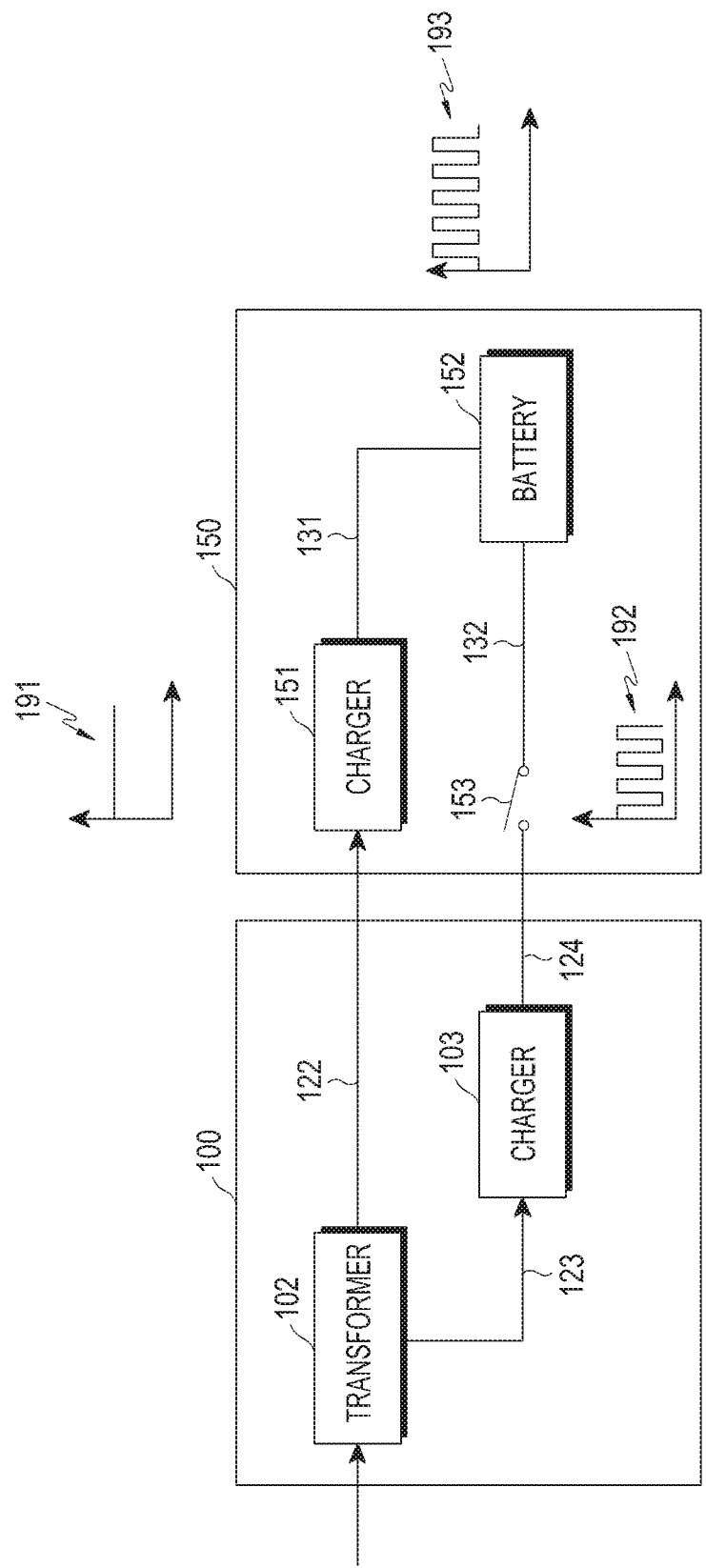
FIG. 1B is a block diagram according to various embodiments of the present disclosure.

FIG. 1B is a block diagram according to various embodiments of the present disclosure.

The adapter 100 may include a transformer 102 and a charger 103. The electronic device 150 may include a charger 151, a battery 152, and a switch 153.

The transformer 102 transforms, e.g., down-converts, the power from the external power source. The transformer 102 may include a primary side coil having a first winding number and a secondary side coil having a second winding number. The transformer 102 may output the power after changing the level of the power based on a winding number difference. Thus, once power having a voltage of a first level is input, the transformer 102 performs transformation to output power having a voltage of a second level. The transformer 102 may have a plurality of paths 122 and 123 for outputting power. Herein, a path from the transformer 102 to the charger 151 of the electronic device 150 may be referred to as a first path 122, and power having the second-level voltage may be applied to the first path 122. The transformer 102 outputs power being different from the power in the first path 122 to the charger 103 through a second path 123. The power output to the charger 103 has the second-level voltage that is the same as that of the power output through the first path 122 or has a voltage of a third level being different from the second level.

The charger 103 adjusts at least one of a voltage or a current of input power suitably for the battery 152. For example, if the battery 152 needs to be charged with a voltage of a fourth level, the charger 103 may adjust the input second-level or third-level voltage to the fourth level and output the fourth-level voltage. As stated above, the charger 103 may output power having a voltage and a current required for charging of the battery 152 through a second path 124. The charger 103 may adjust a voltage and a current according to one of a constant current (CC) mode and a constant voltage (CV) mode. The CC mode is a charging mode in which a CC is continuously transferred to the battery, and the CV mode is a charging mode in which a CV is across both terminals of the battery. The charger 103 according to various embodiments of the present disclosure charges the battery with a CC in the CC mode in the early stage of charging, and in this case, a battery voltage increases. As the battery voltage reaches a threshold value, the charger 103 charges the battery in the CV mode. The charger 103 adjusts at least one of a voltage or a current of input power in various ways such as a multi-step constant current (MSCC), a multi-step constant voltage (MSCV), etc.

The charger 151 adjusts at least one of a voltage or a current of power input through the first path 122, suitably for the battery 152. For example, if the battery 152 needs to be charged with the fourth-level voltage, the charger 151 may adjust the second-level voltage of the power to the fourth level and output the fourth-level voltage. As stated above, the charger 151 outputs power having the voltage and the current required for charging of the battery 152. The charger 151 also adjusts a voltage across the battery 152 or a current input to the battery 152 according to one of the CC mode, the CV mode, the MSCC, and the MSCV.

The power output from the charger 151 is delivered to the battery 152 through a first path 131. For example, in a normal charging mode, not in a fast charging mode, the battery 152 may receive power from the adapter 100 merely through the first path 131. In this case, the switch 153 may be controlled to be in an off state.

On the other hand, in the fast charging mode, the switch 153 may be in an on state. Thus, the adjusted power is provided to the battery 152 through second paths 124 and 132. Eventually, the battery 152 may be charged fast as being provided with power through the first path 131 and the second path 132. A waveform 193 of power provided to the battery 152 is a sum of a waveform 191 of power output from the charger 151 and a waveform 192 of power output from the charger 103. The first path 122 may be a power lane, for example, in an USB-micro B type, and the second paths 124 and 132 may be data lanes, for example, in the USB-micro B type. In various embodiments of the present disclosure, the electronic device 150 may connect the data lane of the USB-micro B type to a processor or to the battery 152.

In particular, as both the charger 151 of the electronic device 150 and the charger 103 of the adapter 100 provide power having conditions suitable for charging of the battery 152, charging of the battery 152 may be performed well. Moreover, when power of a relatively high level is provided to the electronic device 150 for fast charging, provisioning of the power may be distributed through the plurality of paths 131 and 132 corresponding to the plurality of chargers 103 and 151, such that a heat emission quantity in each of the chargers 103 and 151 may not be large. The heat emission quantity is proportional to the square of power, such that if a current of an identical level is distributed to each of the chargers 103 and 151, a heat emission quantity in each of the chargers 103 and 151 may be reduced to ¼ of an existing case and an overall heat emission in the electronic device 150 may be reduced to ½ of the existing case.

Figure 1C:
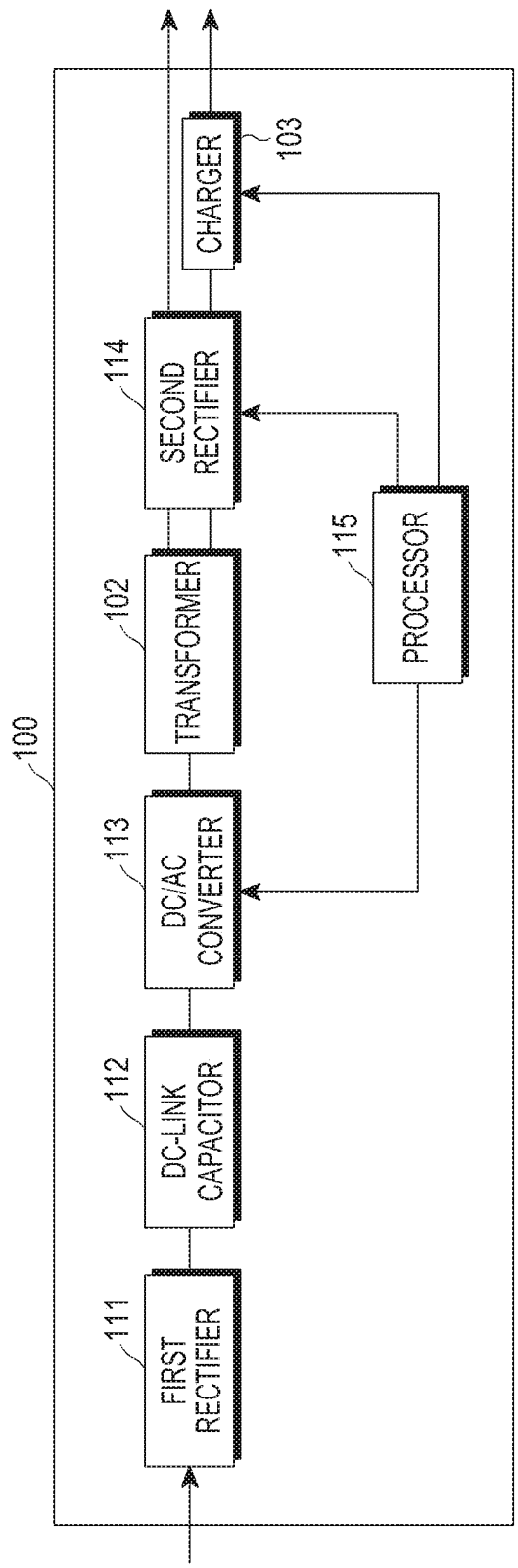
FIG. 1C is a detailed block diagram of an adapter according to various embodiments of the present disclosure.

FIG. 1C is a detailed block diagram of the adapter 100 according to various embodiments of the present disclosure. The adapter 100 may include a first rectifier 111, a direct-current link (DC-link) capacitor 112, a DC/(alternating current) AC converter 113, the transformer 102, a second rectifier 114, the charger 103, and a processor 115.

The first rectifier 111 rectifies power of an AC waveform received from an external power source into power of a DC waveform. The DC-link capacitor 112 temporarily stores the rectified power and outputs the temporarily stored rectified power to the DC/AC converter 113. The DC/AC converter 113 converts the power of the DC waveform into the power of the AC waveform and applies the AC-waveform power to the primary side coil of the transformer 102. To the secondary side coil of the transformer 102, the transformed power of the AC waveform is induced according a winding number ratio. The transformer 102 may have a plurality of output terminals, through each of which power of a different-level or identical-level voltage may be output. The second rectifier 114 rectifies each AC-waveform power output from the transformer 102. The second rectifier 114 outputs the rectified power directly to the charger 151 of the electronic device 150 and outputs the rectified power to the charger 103 inside the adapter 100. The charger 103 adjusts at least one of a current or a voltage of the power input suitably for charging of the battery 152 of the electronic device 150 and provides the adjusted power directly to the battery 152 of the electronic device 150.

The processor 115 controls at least one of the DC/AC converter 113, the second rectifier 114, or the charger 103 to control at least one of a converting gain, a level of the power output from the second rectifier 114, or a current and a voltage of the power output from the charger 103. According to various embodiments of the present disclosure, the processor 115 may obtain identification information or battery charging information of the electronic device 150 and may control at least one of the DC/AC converter 113, the second rectifier 114, or the charger 103. For example, the processor 115 may recognize information indicating that a charging voltage of the battery 152 of the electronic device 150 is 4V, thus adjusting a voltage level of the power output to the battery 152 of the electronic device 150 from the charger 103 to 4V. If another electronic device is connected, the processor 115 may recognize information indicating that a charging voltage is 5V, thus changing a voltage level of the power output from the charger 103 to 5V. The processor 115 obtains the identification information or the battery charging information through USB communication with the electronic device 150.

In another embodiment of the present disclosure, the adapter 100 may not include the processor 115. In this case, the adapter 100 may be manufactured corresponding to a model of an electronic device, such that operations of the DC/AC converter 113, the second rectifier 114, and the charger 103 may also be set in advance to correspond to the model of the electronic device. For example, the adapter 100 may be manufactured to charge the electronic device 150 of a model A. The model A may charge a battery with 4V, and the adapter 100 may be manufactured such that a voltage level of the power output from the charger 103 is 4V.

Figure 2:
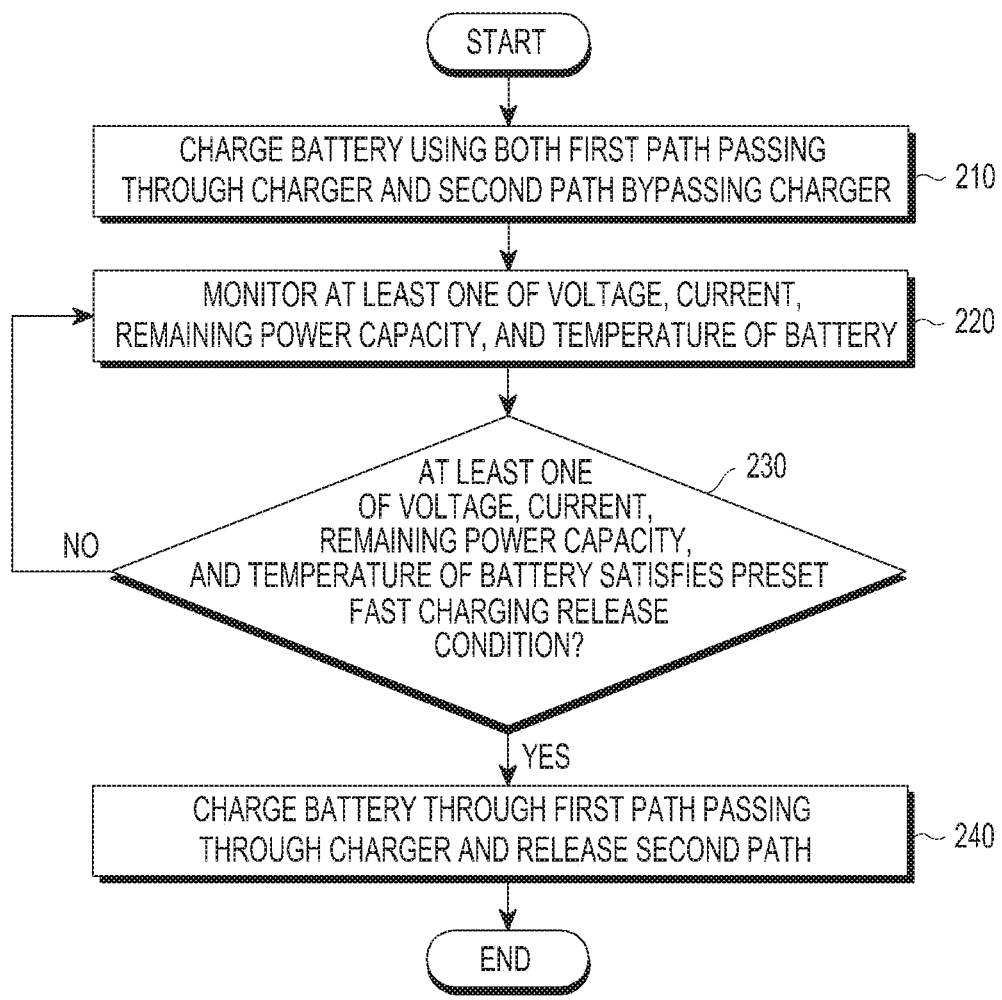
FIG. 2 is a flowchart of a method for controlling an electronic device according to various embodiments of the present disclosure.

FIG. 2 is a flowchart of a method for controlling an electronic device according to various embodiments of the present disclosure.

In operation 210, the electronic device charges a battery by using both a first path passing through a charger of the electronic device and a second path bypassing the charger. When the electronic device performs a particular operation, it may mean that a processor of the electronic device performs the particular operation or the processor controls another hardware to perform the particular operation. Hardware other than the processor may perform the particular operation.

The battery may be charged fast as receiving power through a plurality of paths. According to various embodiments of the present disclosure, the electronic device may perform fast charging if a condition for performing fast charging is detected. For example, the electronic device may perform fast charging upon receiving a user input. The electronic device may perform fast charging if a remaining capacity of a battery satisfies a preset condition. The electronic device may perform fast charging if a temperature of the battery satisfies a preset condition. The fast charging condition is simply an example, and those of ordinary skill in the art will easily understand that there is no limitation in the fast charging condition.

In operation 220, the electronic device monitors at least one of a voltage, a current, a remaining power capacity, or a temperature of the battery. In operation 230, the electronic device determines whether at least one of the voltage, the current, the remaining power capacity, or the temperature of the battery satisfies a preset fast charging release condition. For example, when at least one of the voltage, the current, the remaining power capacity, or the temperature of the battery exceeds a preset threshold value, it may mean that the fast charging release condition is satisfied. It would be easily understood by those of ordinary skill in the art that the fast charging release condition is not limited as long as it indicates a condition or buffering state that is set to prevent deterioration of at least one hardware. For example, the fast charging release condition may be set such that it is satisfied when at least one of a voltage, a current, or a temperature of the charger exceeds a preset threshold value. The electronic device may include a voltmeter or an ammeter capable of monitoring a voltage or a current, which may be implemented in various forms such as an electrodynamic voltmeter, a static electricity voltmeter, a digital voltmeter, a DC ammeter, an AC ammeter, a digital ammeter, etc.

Once the fast charging release condition is detected, the electronic device charges the battery through the first path passing through the charger located inside the electronic device and releases the second path in operation 204. For example, the electronic device may release the second path by controlling a switch, which connects the charger of the adapter with the battery of the electronic device, to be in an off state. Thus, the electronic device may charge the battery through the first path passing through the charger, that is, in the normal charging mode.

Figure 3A:
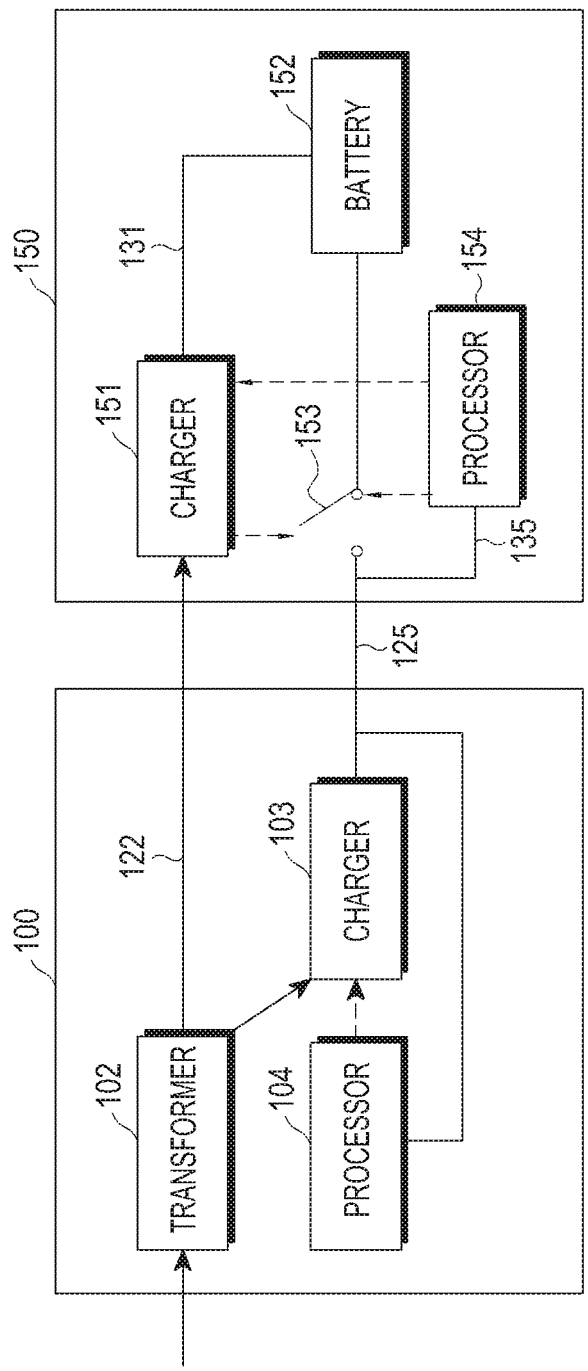
FIG. 3A is a block diagram of an adapter and an electronic device according to various embodiments of the present disclosure.
Figure 4:
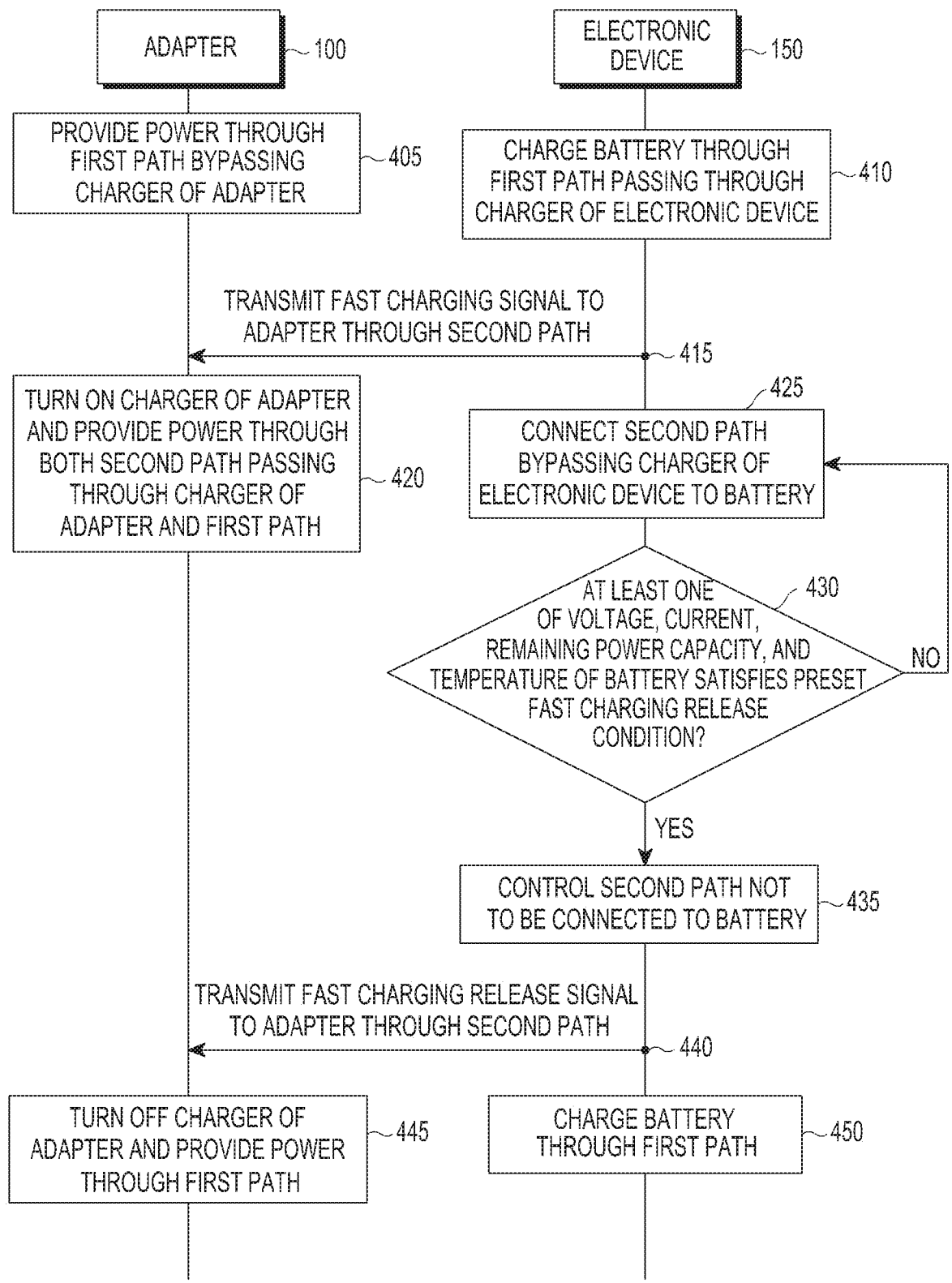
FIG. 4 is a flowchart of a method for controlling an adapter and an electronic device according to various embodiments of the present disclosure.

FIG. 3A is a block diagram of an adapter and an electronic device according to various embodiments of the present disclosure. The embodiment of FIG. 3A will be described in more detail with reference to FIG. 4. FIG. 4 is a flowchart of a method for controlling an adapter and an electronic device according to various embodiments of the present disclosure.

Referring to FIG. 3A, the adapter 100 may include the transformer 102, the charger 103, and the processor 104. The processor 104 controls the charger 103 to adjust at least one of a voltage or a current of power input to the charger 103 suitably for charging of the battery 152.

The adapter 100 communicates with the electronic device 150. According to various embodiments of the present disclosure, a processor 154 of the electronic device 150 delivers data to the processor 104 of the adapter 100 through second paths 125 and 135, e.g., data lanes. Thus, the electronic device 150 sends a fast charging request to the adapter 100. The electronic device 150 delivers the fast charging request to the processor 104 of the adapter 100 through the second paths 125 and 135 if a fast charging condition is detected. After the fast charging request is sent, the processor 154 controls a switch 153 to be in an on state.

Referring to FIG. 4, in operation 405, the adapter 100 provides power to the electronic device 150 through the first path 122 that does not pass through or bypasses the charger 103 of the adapter 100, e.g., a power lane. In operation 410, the electronic device 150 charges the battery through the first path 131 that passes through the charger 151 of the electronic device 150 by using power provided from the adapter 100. In operation 415, the processor 154 of the electronic device 150 sends a fast charging signal to the adapter 100 through the second paths 125 and 135, e.g., the data lanes.

In operation 420, the processor 104 of the adapter 100 turns on the charger 103 of the adapter 100 and provides power to the electronic device 150 through both the second path 125 passing through the charger 103 of the adapter 100 and the first path 122. According to various embodiments of the present disclosure, the adapter 100 maintains the charger 103 in a turn-off state before receiving the fast charging signal. The adapter 100 turns on the charger 103 upon receiving the fast charging signal and turns off the charger 103 upon receiving a fast charging release signal. As the charger 103 is turned on only in fast charging, power consumption and heat emission in the charger 103 may be reduced.

In operation 425, the electronic device 150 connects the second path 125 that bypasses the charger 151 of the electronic device 150 to the battery 152. For example, the processor 154 of the electronic device 150 may control the switch 153 to be in an on state, thus connecting the charger 103 with the battery 152. In this way, the battery 152 is provided with power through the charger 151 of the electronic device 150 and the charger 103 of the adapter 100, making fast charging of the battery 152 possible. In various embodiments, the charger 151 of the electronic device 150 may control on/off of the switch 153. When the switch 153 is controlled to be an on state, the charger 103 of the adapter 100 may be connected to the battery 152 and the processor 154 at the same time. However, an impedance of the processor 154 may be set higher than an impedance of the battery 152, such that a current output from the charger 103 in fast charging may mostly flow to the battery 152.

In operation 430, the electronic device 150 determines whether a fast charging release condition for current fast charging is satisfied. For example, the electronic device 150 may determine whether at least one of a voltage, a current, remaining power capacity, or a temperature of the battery 152 satisfies a preset fast charging release condition. Once the fast charging release condition is detected, the electronic device 150 stops providing charging power through the second path 125 in operation 435. For example, the electronic device 150 may disconnect the charger 103 of the adapter 100 from the battery 152 upon detecting the fast charging release condition. For example, the electronic device 150 may determine whether to connect the second path 125 according to whether at least one of a voltage at an input terminal of the charger 151, a current at the input terminal of the charger 151, a voltage at an output terminal of the charger 151, a current at the output terminal of the charger 151, or a temperature of the charger 151 satisfies a preset fast charging release condition.

In operation 440, the electronic device 150 sends a fast charging release signal to the adapter 100 through the second paths 125 and 135, e.g., the data lane. In operation 445, the adapter 100 turns off the charger 103 of the adapter 100 and provides power to the electronic device 150 only through the first path 122. In operation 450, the electronic device 150 charges the battery 152 by using power provided through the first paths 122 and 131.

As stated above, the adapter 100 according to various embodiments of the present disclosure controls the charger 103 to be in the on state only during fast charging, thus reducing power consumption and heat emission in the charger 103.

Figure 3B:
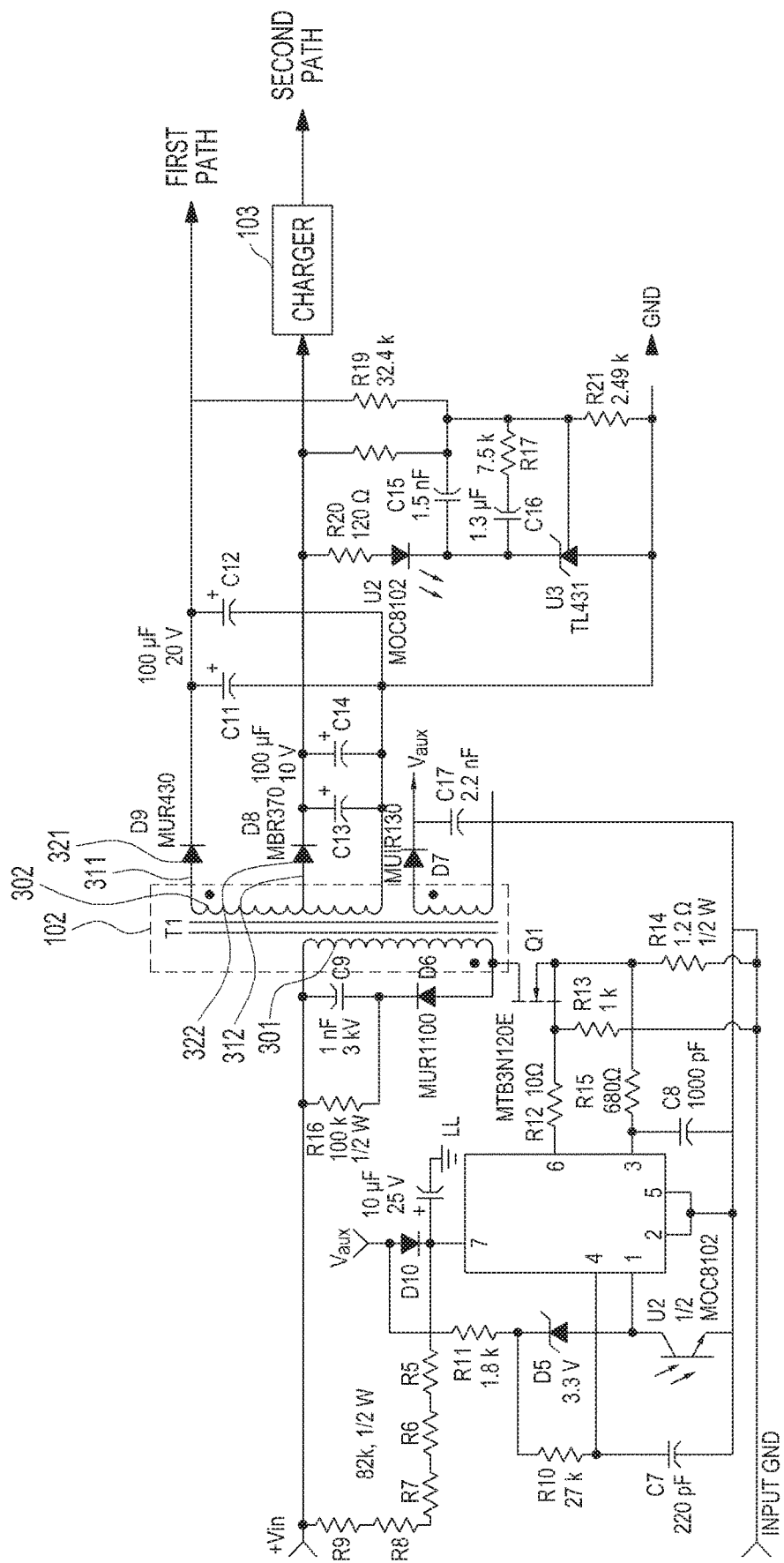
FIG. 3B is a circuit diagram of an adapter according to various embodiments of the present disclosure.

FIG. 3B is a circuit diagram of an adapter according to various embodiments of the present disclosure.

Referring to FIG. 3B, the transformer 102 of the adapter 100 may include a primary side coil 301 and a secondary side coil 302. Power may be transformed according to a winding number ratio between the primary side coil 301 and the secondary side coil 302. The secondary side coil 301 may include a plurality of output terminals 311 and 312. For example, the first output terminal 311 may be connected to a first point of the secondary side coil 302, and the second output terminal 312 may be connected to a second point of the secondary side coil 302. Thus, a voltage of power output from the first output terminal 311 and a voltage of the power output from the second output terminal 312 may be different from each other, and this difference may result from different winding number ratios. The power output from the first output terminal 311 may be rectified by the first rectifier 321 and may be output to a first path. The power output from the second output terminal 312 may be rectified by the second rectifier 322 and may be output to the charger 103. The charger 103 adjusts at least one of a current or a voltage of the power provided suitably for charging of the battery of the electronic device and outputs the adjusted power to a second path. As stated above, the first path may be connected to the charger 103 of the electronic device and the second path may be connected to the battery of the electronic device.

Figure 5:
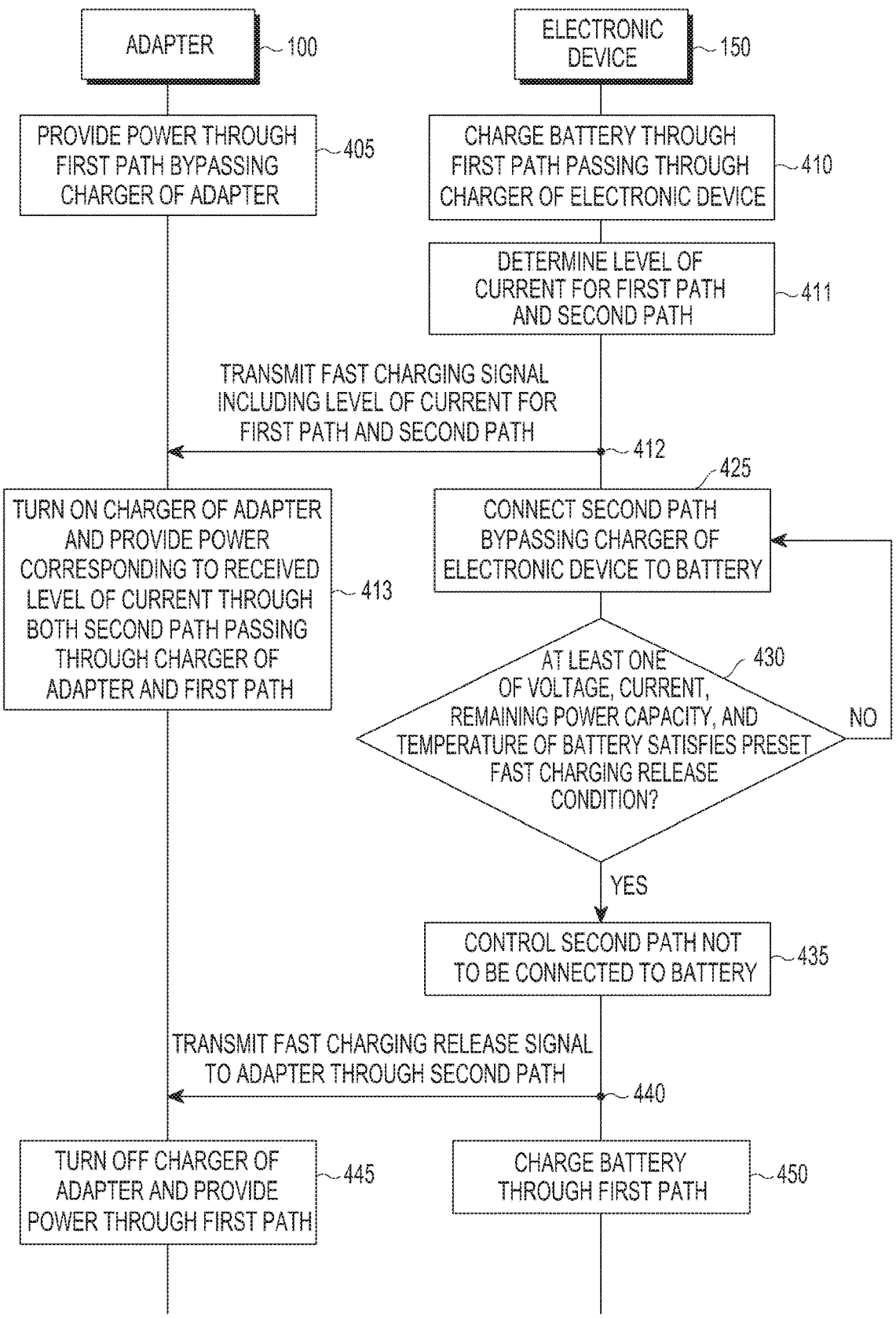
FIG. 5 is a flowchart of a method for controlling an adapter and an electronic device according to various embodiments of the present disclosure.

FIG. 5 is a flowchart of a method for controlling an adapter and an electronic device according to various embodiments of the present disclosure.

Operations 405 and 410 and operations 425 through 450 have already been described with reference to FIG. 4, and thus will not be further described at this time.

In operation 411, the electronic device 150 determines a level of a current for the first path and the second path. More specifically, the electronic device 150 may set a level of a current for each of the first path and the second path based on a charging efficiency of the charger 151 of the electronic device 150 and a charging efficiency of the charger 103 of the adapter 100. For example, if it is determined that the charging efficiency of the charger 151 of the electronic device 150 is higher than that of the charger 103 of the adapter 100, the electronic device 150 may set a level of a current for the first path to be higher than a level of a current for the second path. The electronic device 150 may determine the charging efficiencies of the chargers 103 and 151 by using a preset algorithm or on a real time basis. The electronic device 150 sets a level of a current for each of the first path and the second path by using the temperature of each of the chargers 103 and 151. That is, the electronic device 150 sets levels of currents output by the chargers 103 and 151 for charging of the chargers 103 and 151 with optimal efficiency. A process of determining the optimal efficiency will be described in more detail with reference to FIGS. 14A, 14B, and 15.

In operation 412, the electronic device 150 sends a fast charging signal including a level of a current for each of the first path and the second path to the adapter 100. For example, the electronic device 150 may send a fast charging signal through the second paths 125 and 135, e.g., the data lanes.

In operation 413, the adapter 100 turns on the charger 103 and provides power through both the second path passing through the charger 103 of the adapter 100 and the first path. In this case, the adapter 100 may let a current flow through each of the first path and the second path by using the level of the current for each of the first path and the second path included in the fast charging signal.

As discussed above, the electronic device 150 may perform fast charging with the optimal efficiency and also take the temperature into account for fast charging, thereby reducing heat emission in the electronic device 150.

Figure 6:
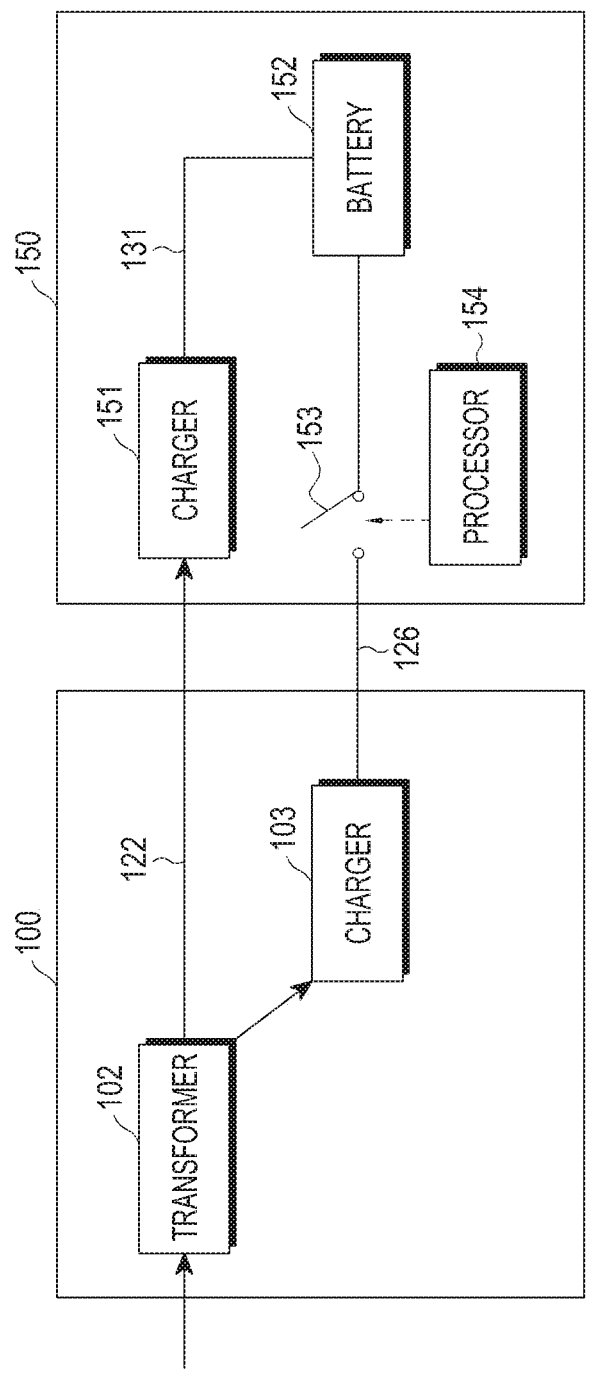
FIG. 6 is a block diagram of an adapter and an electronic device according to various embodiments of the present disclosure.
Figure 7:
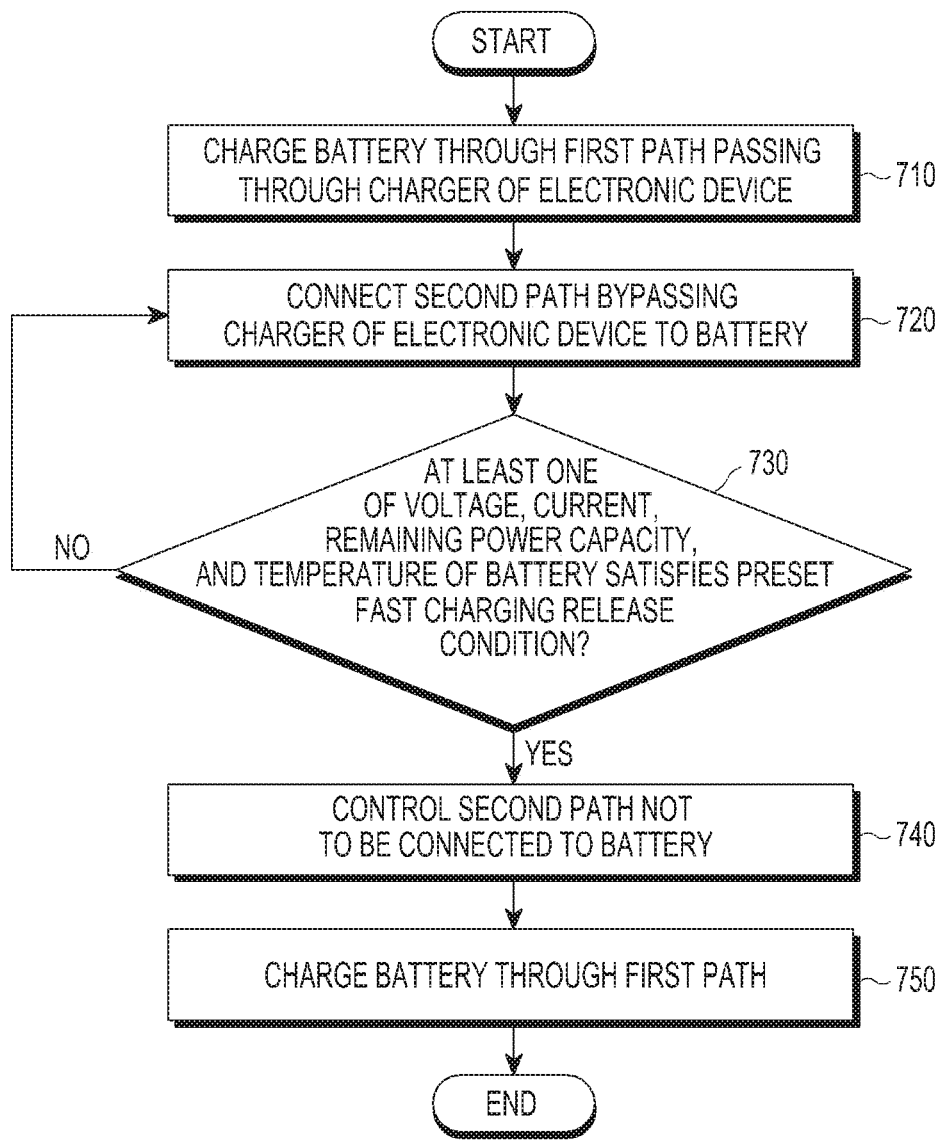
FIG. 7 is a flowchart of a method for controlling an adapter and an electronic device according to various embodiments of the present disclosure.

FIG. 6 is a block diagram of an adapter and an electronic device according to various embodiments of the present disclosure. The embodiment of FIG. 6 will be described in more detail with reference to FIG. 7. FIG. 7 is a flowchart of a method for controlling an adapter and an electronic device according to various embodiments of the present disclosure.

The adapter 100 according to the embodiment of FIG. 6 may not include a processor when compared to the embodiment of FIG. 4. That is, in the adapter 100 according to the embodiment of FIG. 6, the charger 103 maintains the on state at all times. Thus, the power output from the charger 103 may be applied to the second path 126. Moreover, the transformer 102 may provide the power to the electronic device 150 through the first path 122.

In operation 710, the electronic device 150 charges the battery 152 through the first path 131 passing through the charger 151 of the electronic device 150. In operation 720, once the fast charging condition is detected, the electronic device 150 connects a second path 126 that bypasses the charger 151 of the electronic device 150 to the battery 152. That is, the electronic device 150 may perform fast charging without separately communicating with the adapter 100.

In operation 730, the electronic device 150 may determine whether at least one of a voltage of the battery 152, a current of the battery 152, or a charging quantity and a temperature of the battery 152 satisfies a preset fast charging release condition. Once the fast charging release condition is detected, the electronic device 150 controls the second path 126 to not be connected to the battery 152 in operation 740. In operation 750, the electronic device 150 charges the battery 152 by using power provided through the first paths 122 and 131.

Figure 8:
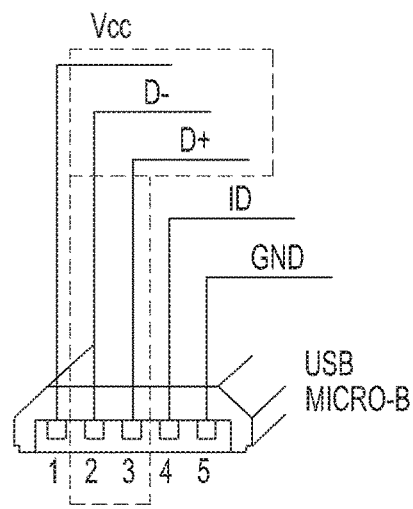
FIG. 8 is a conceptual view for describing a USB-micro B type lane according to various embodiments of the present disclosure.

FIG. 8 is a conceptual view for describing a lane of a USB-micro B type according to various embodiments of the present disclosure.

Referring to FIG. 8, the USB-micro B type may include five channels. A connector and a cable for connecting the adapter with the electronic device may be manufactured by the USB-micro B type. To a first channel of the USB-micro B type, a power lane voltage at the common collector (VCC) may be assigned. The power lane VCC may be used as a first path connected to the charger of the electronic device as described above. Meanwhile, data lanes D− and D+ may be assigned to second and third channels of the USB-micro B type. At least one of the data lanes D− and D+ may be used as a second lane directly connected to the battery of the electronic device from the adapter. A fourth channel of the USB-micro B type may be assigned for an ID lane (ID). The ID is for mode detection, and may be associated with information capable of indicating existence or absence of a connected device. In various embodiments of the present disclosure, the fourth channel may be used as a second path directly connected from the adapter to the battery of the electronic device. A fifth channel of the USB-micro B type may be assigned for grounding.

Figure 9:
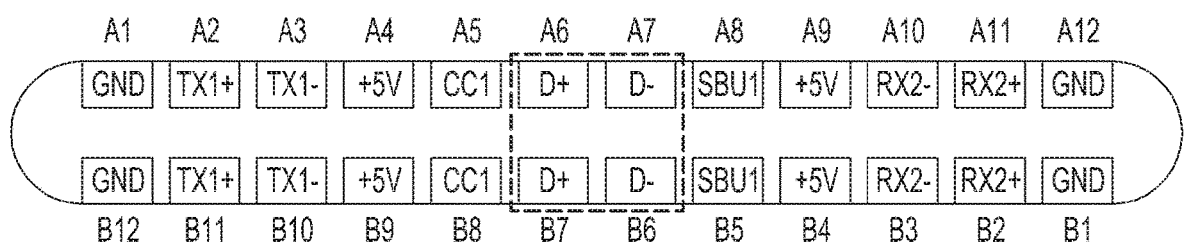
FIG. 9 is a conceptual view for describing a USB-micro C type lane according to various embodiments of the present disclosure.

FIG. 9 is a conceptual view for describing a lane of a USB-micro C type lane according to various embodiments of the present disclosure.

Referring to FIG. 9, a power lane +5V is assigned to channels A4, A8, B4, and B9 of the USB-C type. The power lane +5V may be used as a first path connected to the charger of the electronic device as described above. Data lanes D− and D+ are assigned to channels A6, A7, B6, and B7 of the USB-C type. At least one of the data lanes D− and D+ may be used as a second lane directly connected to the battery of the electronic device from the adapter. At least one of other channels A2, A3, A8, A10, A11, B2, B3, B8, B10, or B11, except for the channels A1, A12, B1, B12 to be assigned for grounding, may be used as the second path directly connected to the battery of the electronic device from the adapter.

As mentioned above, the adapter or the electronic device to which the USB-micro B type is applied uses the power lane VCC as the first path connected to the charger of the electronic device, and the data lanes D− and D+ or the ID lane ID other than the power lane VCC may be used as the second path connected to the battery of the electronic device from the charger of the adapter. Thus, without changing existing USB standards, fast charging may be performed.

Figure 10:
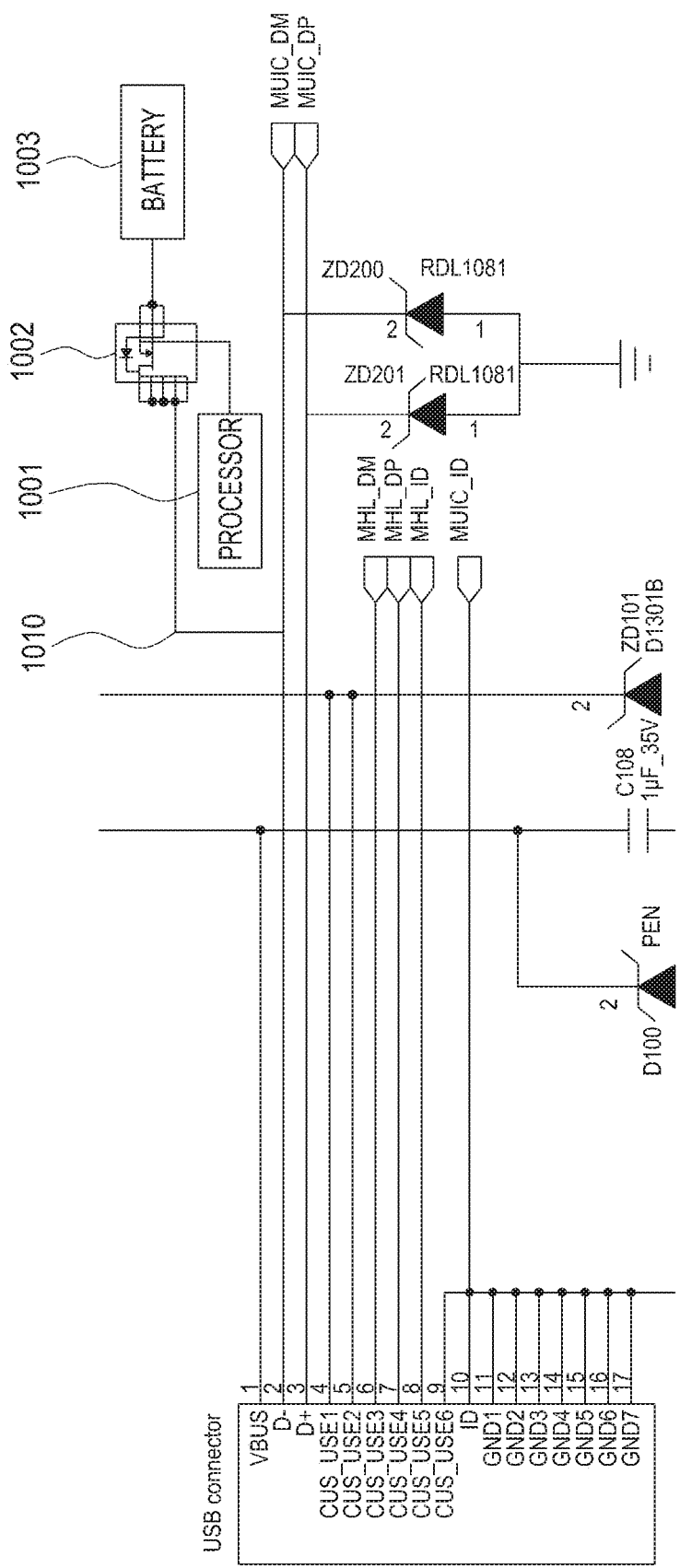
FIG. 10 is a conceptual view for describing a USB port of an electronic device according to various embodiments of the present disclosure.

FIG. 10 is a conceptual view for describing a USB port of an electronic device according to various embodiments of the present disclosure. In an embodiment of FIG. 10, the data lane D− may be used as a second path that connects the charger of the adapter with the battery of the electronic device. That is, power adjusted suitably for charging of a battery 1003 may be provided by the charger of the adapter to the data lane D− in the fast charging mode.

Referring to FIG. 10, the data lane D− in an USB connector of the electronic device is connected to a terminal MUIC_DM connectable to an application processor (AP), etc. Thus, the AP of the electronic device receives data from the adapter through the terminal MUIC_DM or receives data from another electronic device other than the adapter. The AP of the electronic device may transmit data to the adapter or another electronic device through a terminal MUIC_DP.

The data lane D− is connected to a switch 1002 through another path 1010. The processor 1001 controls on/off of the switch 1002. In the normal charging mode, a processor 1001 controls the switch 1002 to be in the off state. Thus, the data lane D− may be connected to the terminal MUIC_DM for use in data communication. In the fast charging mode, the processor 1001 controls the switch 1002 to be in the on state. In this way, power output from the charger of the adapter may be provided to the battery 1003. The processor 1001 may be implemented with various processors such as an AP, a control processor (CP), etc., or may be implemented with a sole processor for fast charging.

Figure 11A:
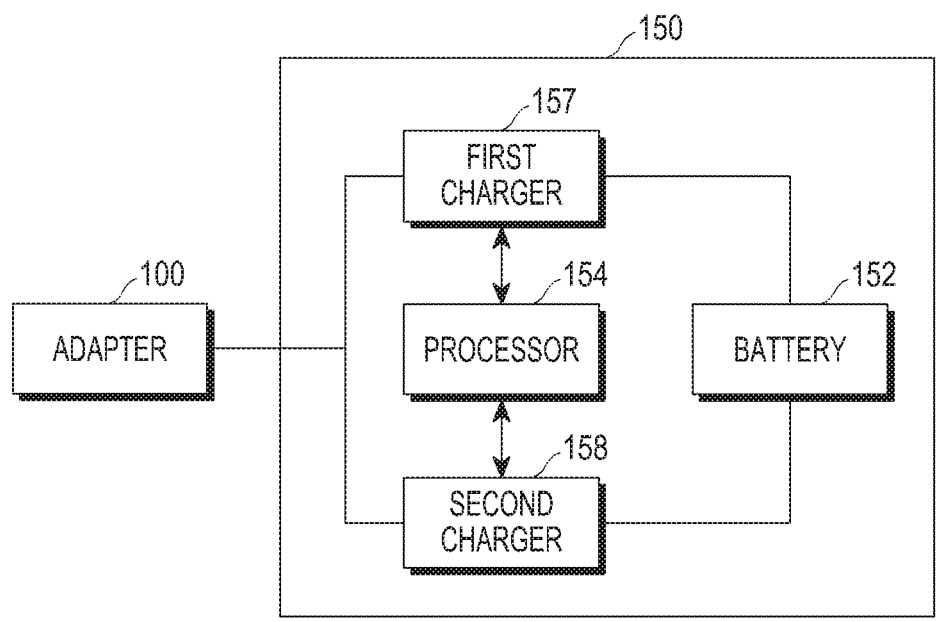
FIG. 11A is a block diagram of an adapter and an electronic device according to various embodiments of the present disclosure.
Figure 12:
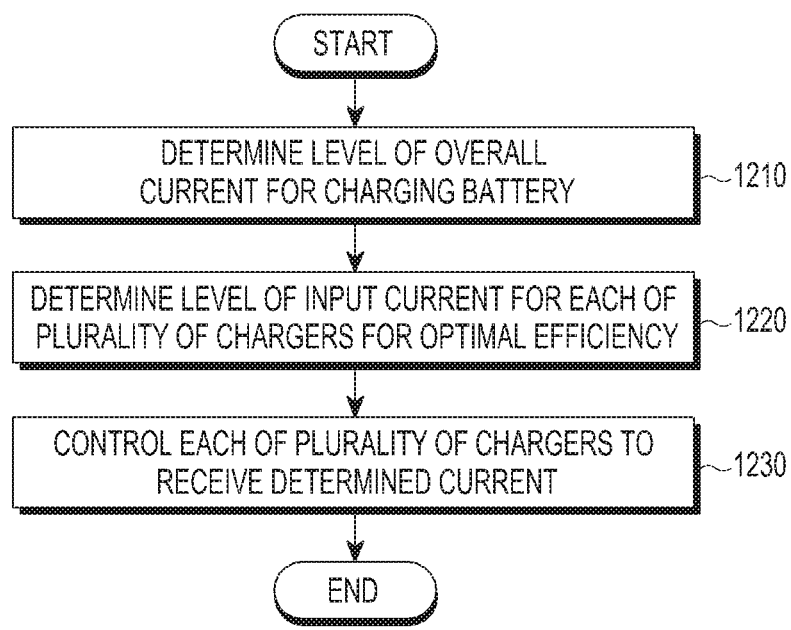
FIG. 12 is a flowchart of a method for controlling an electronic device according to various embodiments of the present disclosure.

FIG. 11A is a block diagram of an adapter and an electronic device according to various embodiments of the present disclosure. FIG. 11A will be described in more detail with reference to FIG. 12. FIG. 12 is a flowchart of a method for controlling an electronic device according to various embodiments of the present disclosure.

Referring to FIG. 11A, the electronic device 150 may include a first charger 157 and a second charger 158. A plurality of chargers is included in the electronic device 150 and the adapter 100, respectively, in the embodiment of FIG. 1B, whereas the plurality of chargers 157 and 158 are included in the electronic device 150 in the embodiment of FIG. 11A.

In operation 1210, the processor 154 of the electronic device 150 determines a level of an overall current for charging the battery 152. In operation 1220, the processor 154 determines a level of an input current for each of the plurality of chargers 157 and 158 for the optimal efficiency. The processor 154 determines a charging efficiency for each of the plurality of chargers 157 and 158 and determines a level of an input current for each of the plurality of chargers 157 and 158 in such a way to obtain the highest overall charging efficiency. In addition, the processor 154 may determine a level of an input current for each of the plurality of chargers 157 and 158 based on a temperature of each of the plurality of chargers 157 and 158. In operation 1230, the electronic device 150 controls each of the plurality of chargers 157 and 158 to receive determined-level current.

Figure 11B:
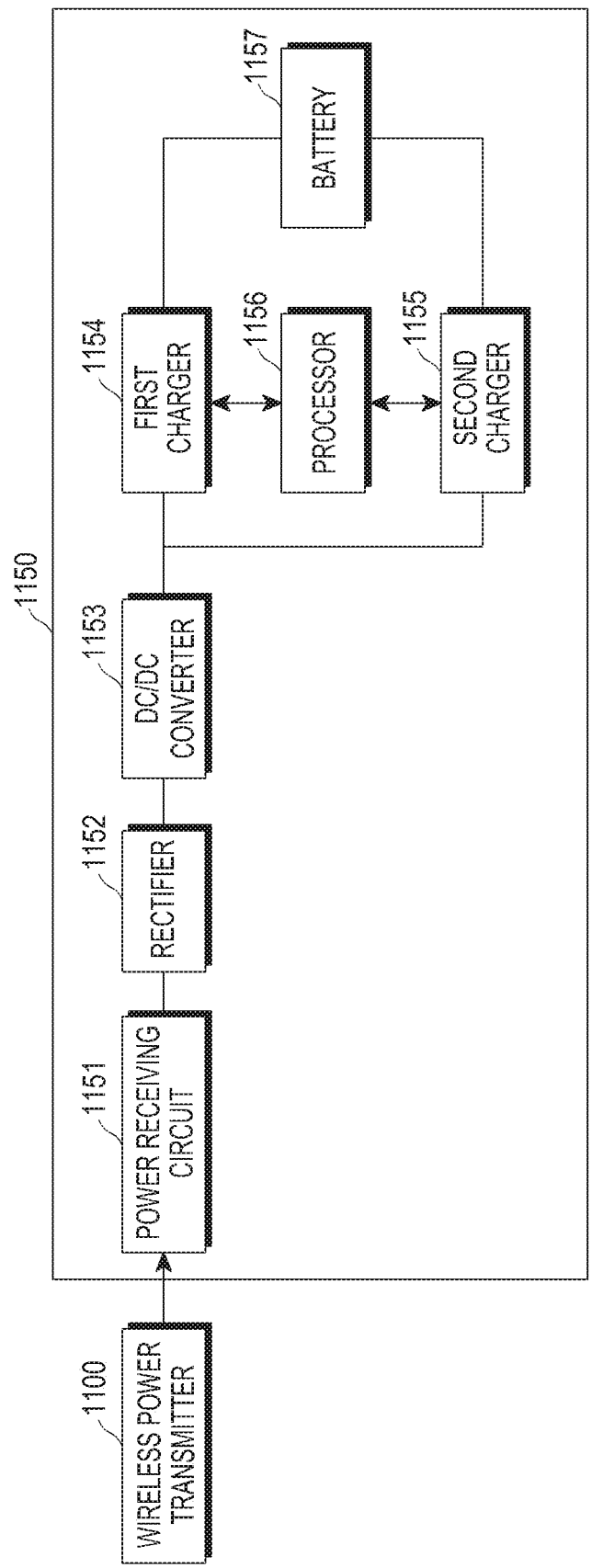
FIG. 11B is a block diagram of an electronic device capable of performing wireless charging according to various embodiments of the present disclosure.

FIG. 11B is a block diagram of an electronic device capable of performing wireless charging according to various embodiments of the present disclosure.

Referring to FIG. 11B, an electronic device 1150 may include a power receiving circuit 1151, a rectifier 1152, a DC/DC converter 1153, a first charger 1154, a second charger 1155, a processor 1156, and a battery 1157.

The power receiving circuit 1151 wirelessly receives power from a wireless power transmitter 1100. The power receiving circuit 1151 receives power according to one of various schemes such as an inducing scheme based on wireless power consortium (WPC) standards, a resonance scheme based on Alliance For Wireless Power (A4WP) standards, a radio frequency (RF) scheme, and so forth.

The power of the AC waveform received by the power receiving circuit 1151 is rectified by the rectifier 1152. The power rectified by the rectifier 1152 is down-converted to a level suitable for battery charging by the DC/DC converter 1153. The processor 1156 determines a level of an input current for each of a plurality of chargers 1154 and 1155 for the optimal efficiency. The processor 1156 determines a charging efficiency for each of the plurality of chargers 1154 and 1155 and determines a level of an input current for each of the plurality of chargers 1154 and 1155 in such a way to obtain the highest overall charging efficiency. In addition, the processor 1156 may determine a level of an input current for each of the plurality of chargers 1154 and 1155 based on a temperature of each of the plurality of chargers 1154 and 1155. The electronic device 1150 controls each of the plurality of chargers 1154 and 1155 to receive the determined-level current, such that the battery 1157 is charged with the power output from each charger.

As described in detail with reference to FIGS. 11A and 11B, the electronic device according to various embodiments of the present disclosure may receive power in a wired or wireless manner, and heat emission in an individual charger may be reduced as the battery is charged by a plurality of chargers.

Figure 13:
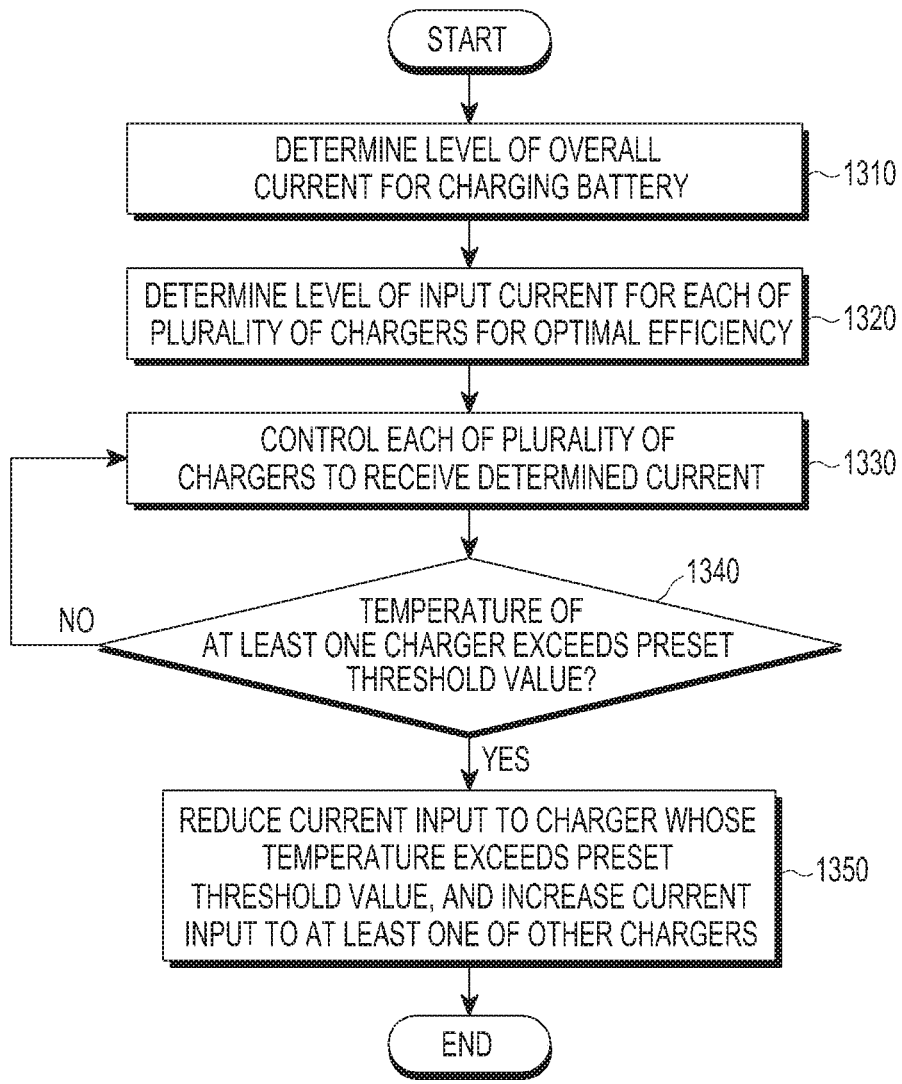
FIG. 13 is a flowchart of a method for controlling an electronic device according to various embodiments of the present disclosure.

FIG. 13 is a flowchart of a method for controlling an electronic device according to various embodiments of the present disclosure.

In operation 1310, the electronic device determines a level of an overall current for battery charging. In operation 1320, the electronic device determines a level of an input current for each of a plurality of chargers for the optimal efficiency. In operation 1330, the electronic device controls each of the plurality of chargers to receive determined-level current. For example, the electronic device may adjust an input current value of a charger and control the input current value of the charger to receive the determined current.

In operation 1340, the electronic device determines whether a temperature of at least one charger exceeds a preset threshold value. For example, the electronic device may include at least one temperature sensor capable of sensing a temperature of each of a plurality of chargers. The electronic device obtains data from each of the at least one temperature sensor and senses a temperature of each charger.

In operation 1350, the electronic device reduces a current input to a charger whose temperature exceeds the preset threshold value and increases a current input at least one of the other chargers. Thus, the electronic device may reduce a heat emission in a charger whose temperature exceeds the preset threshold value. Meanwhile, if the temperature of the charger whose temperature has exceeded the preset threshold value is reduced below the preset threshold value, the electronic device may increase the current input to the charger.

As stated above, the electronic device may charge the battery with the optimal efficiency by using the plurality of chargers, while preventing a particular charger from being overheated.

Figure 14A:
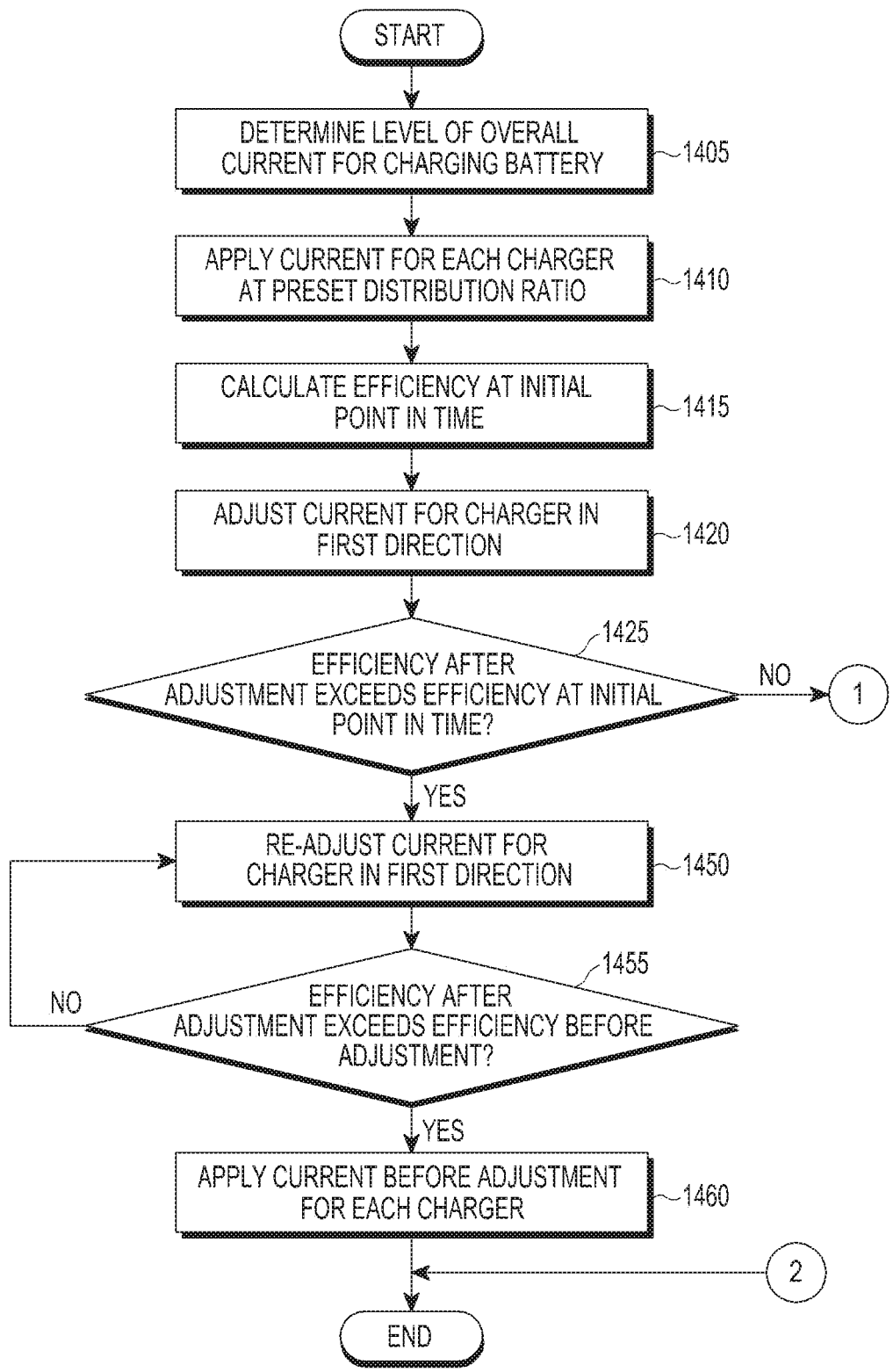
FIGS. 14A and 14B are flowcharts of a method for controlling an electronic device according to various embodiments of the present disclosure.
Figure 14B:
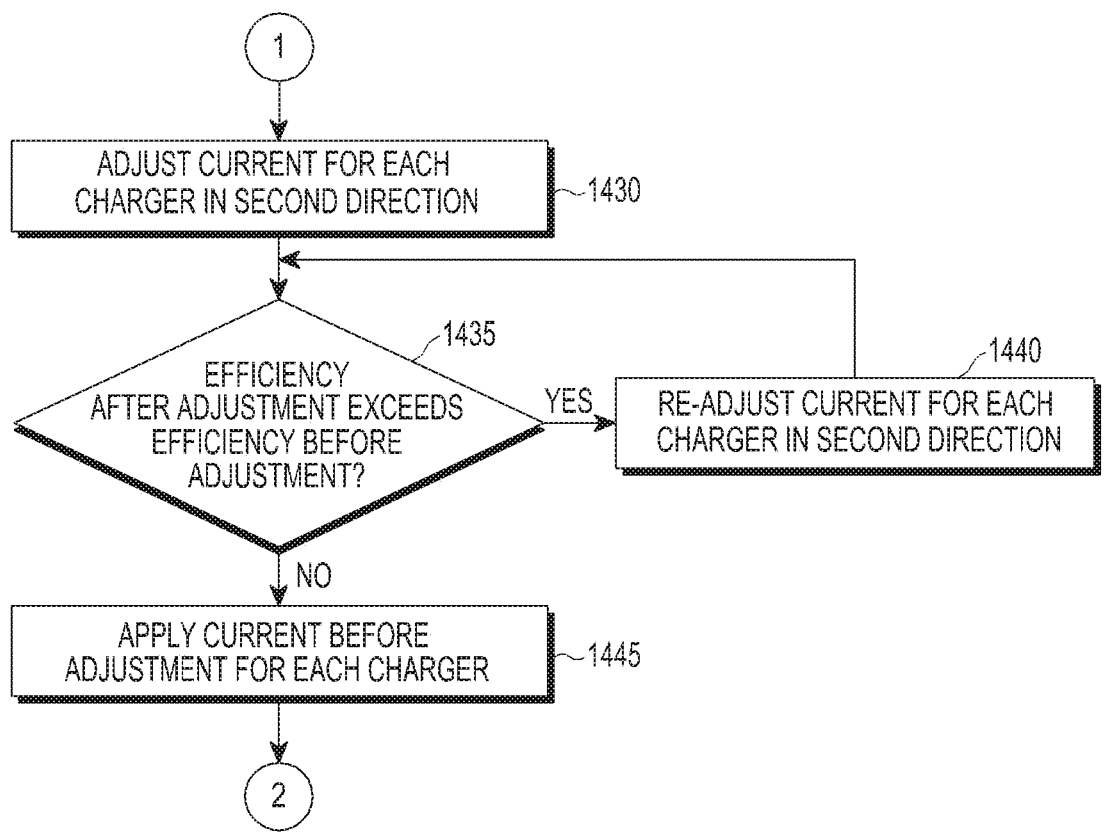

FIGS. 14A and 14B are flowcharts of a method for controlling an electronic device according to various embodiments of the present disclosure.

In operation 1405, the electronic device determines a level of an overall current for battery charging. For example, if the electronic device performs fast charging, the electronic device may determine a high overall current level. In operation 1410, the electronic device applies a current to each charger at a preset distribution ratio. According to various embodiments of the present disclosure, if the electronic device includes a plurality of chargers of the same type, the electronic device equally applies the current to the plurality of chargers.

In operation 1415, the electronic device calculates an efficiency in an initial point in time. For example, the electronic device may include a first charger, a second charger, an ammeter and a voltmeter capable of measuring a current and a voltage at an input terminal of the first charger, and an ammeter and a voltmeter capable of measuring a current and a voltage at an input terminal of the second charger. The voltmeter may be implemented in various types such as an electrodynamic voltmeter, a static electricity voltmeter, a digital voltmeter, etc., without being particularly limited to the types. The voltmeter may be implemented in various types such as a DC ammeter, an AC ammeter, a digital ammeter, etc., without being particularly limited to the types. The electronic device calculates a charging efficiency of the first charger by dividing a product of a current and a voltage at the output terminal of the first charger by a product of a current and a voltage at the input terminal of the first charger. The electronic device calculates a charging efficiency of the second charger by dividing a product of a current and a voltage at the output terminal of the second charger by a product of a current and a voltage at the input terminal of the second charger. The electronic device determines an overall efficiency by using the charging efficiency of the first charger and the charging efficiency of the second charger.

In operation 1420, the electronic device adjusts a level of an input current for each charger in a first direction. Herein, the first direction may mean a direction which increases the input current of the first charger and reduces the input current of the second charger.

In operation 1425, the electronic device determines whether an efficiency after adjustment exceeds an efficiency in the initial point in time. If determining that the efficiency after adjustment does not exceed the efficiency in the initial point in time, the electronic device adjusts a level of an input current for each charger in a second direction in operation 1430. Herein, the second direction may mean a direction opposite to the first direction, which reduces the input current of the first charger and increases the input current of the second charger.

In operation 1435, the electronic device determines whether an efficiency after adjustment exceeds an efficiency before adjustment. If determining that the efficiency after adjustment exceeds the efficiency before adjustment, the electronic device re-adjusts a level of a current for each charger in the second direction in operation 1440. The electronic device re-adjusts the current for each charger in the second direction until the efficiency after adjustment does not exceed the efficiency before adjustment. If determining that the efficiency after adjustment does not exceed the efficiency before adjustment, the electronic device maintains application of the current before adjustment to each charger in operation 1445.

If determining that the efficiency after adjustment exceeds the efficiency in the initial point in time in operation 1425, the electronic device re-adjusts the current for each charger in the first direction in operation 1450. In operation 1455, the electronic device determines whether the efficiency after adjustment exceeds the efficiency before adjustment. The electronic device re-adjusts the current for each charger in the first direction until the efficiency after adjustment does not exceed the efficiency before adjustment. If determining that the efficiency after adjustment does not exceed the efficiency before adjustment, the electronic device maintains application of the current before adjustment to each charger in operation 1460.

As described above, the electronic device determines the level of the current applied to each charger to charge the battery with the optimal efficiency.

Figure 15:
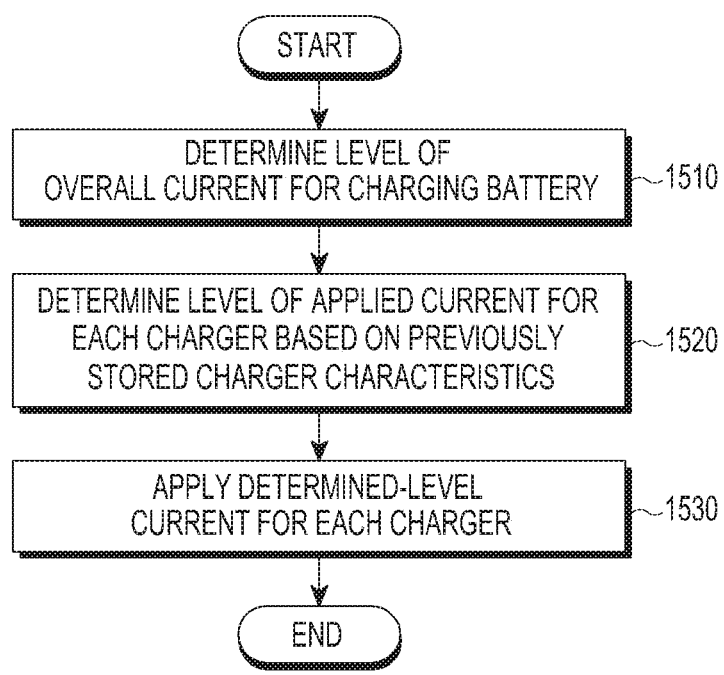
FIG. 15 is a flowchart of a method for controlling an electronic device according to various embodiments of the present disclosure.

FIG. 15 is a flowchart of a method for controlling an electronic device according to various embodiments of the present disclosure.

In operation 1510, the electronic device determines a level of an overall current for battery charging. In operation 1520, the electronic device determines a level of an applied current for each charger based on previously stored charger characteristics. In various embodiments of the present disclosure, the electronic device stores characteristics of a charger in advance. The characteristics of a charger may include a relationship between a level of a current and an efficiency of the charger. The electronic device determines in advance a charger-specific efficiency by using a level of a current input to each charger and an efficiency of each charger, and determines an overall efficiency by using the charger-specific efficiency. The electronic device determines the level of the current input to each charger such that an overall efficiency has the highest value.

In operation 1530, the electronic device applies the determined-level current to each charger. Thus, the electronic device charges the battery with the optimal efficiency without measuring an input current and an input voltage for each charger.

Figure 16:
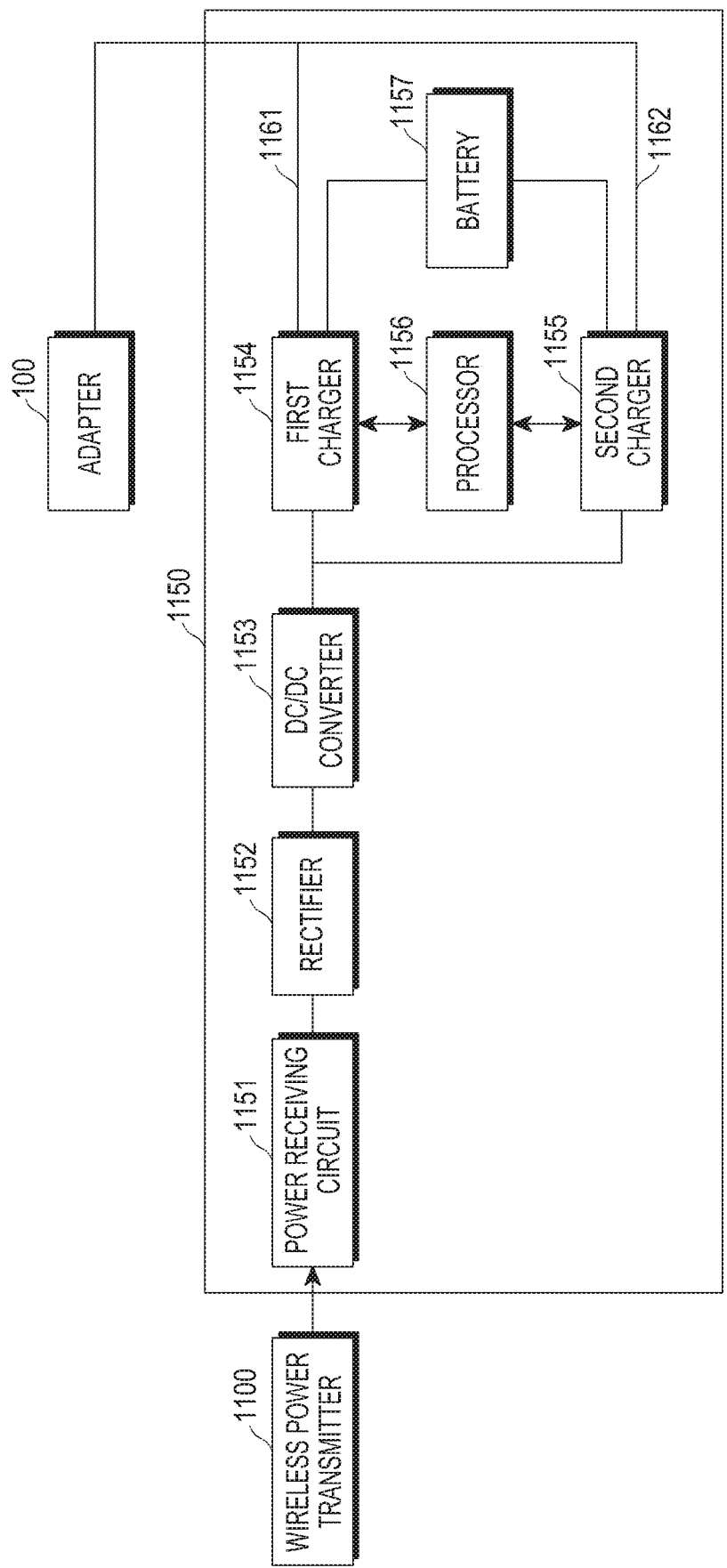
FIG. 16 is a block diagram of an electronic device according to various embodiments of the present disclosure.

FIG. 16 is a block diagram of an electronic device according to various embodiments of the present disclosure.

An electronic device 1150 may further include a first lane 1161 and a second lane 1162 that are connectable to the adapter 100 in comparison to the embodiment of FIG. 11B. The adapter 100 provides power to a first charger 1154 through the first lane 1161, and provides power to a second charger 1155 through the second lane 1162. Thus, if the electronic device 1150 performs wired fast charging, the plurality of chargers 1154 and 1155 provide power to a battery 1157 through the plurality of lanes 1161 and 1162, such that a level of power applied to each of the chargers 1154 and 1155 may be lower than a level of power applied when fast charging is performed with a single charger. As a result, each of the chargers 1154 and 1155 is prevented from being overheated. The electronic device 1150 is capable of performing both wireless charging and wired charging. A processor 1156 determines an efficiency of each of the first charger 1154 and the second charger 1155 based on a current and a voltage of an output terminal of each of the adapter 100 and the DC/DC converter 1153, and determines a current input to each of the first charger 1154 and the second charger 1155 such that an overall efficiency has the highest value.

Figure 17:
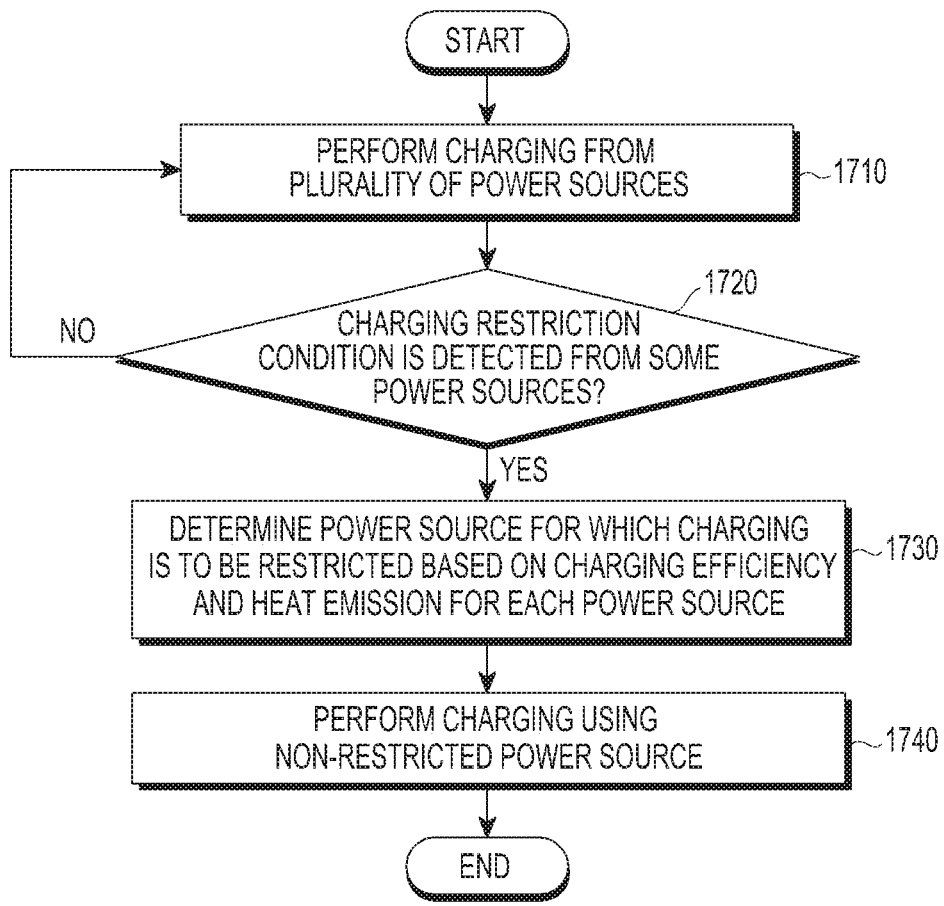
FIG. 17 is a flowchart of a method for controlling an electronic device according to various embodiments of the present disclosure.

FIG. 17 is a flowchart of a method for controlling an electronic device according to various embodiments of the present disclosure.

In operation 1710, the electronic device performs charging from a plurality of power sources. For example, as shown in FIG. 16, the electronic device 1150 performs charging from two power sources, the wireless power transmitter 1100 and the adapter 100. In this way, as providing higher power to a battery, the electronic device may perform fast charging.

In operation 1720, the electronic device determines whether a charging restriction condition is detected from some power sources. For example, the charging restriction condition may be related to at least one of a voltage, a current, power, efficiency, charging time, remaining power capacity, or temperature of the battery. It would be easily understood by those of ordinary skill in the art that the charging restriction condition is not limited as long as it is a condition that is set to prevent deterioration of at least one hardware.

If the charging restriction condition is detected, the electronic device determines a power source for which charging is to be restricted based on a charging efficiency and heat emission for each power source in operation 1730. For example, the electronic device may restrict charging of a power source having a lower charging efficiency based on the charging efficiency for each power source. In operation 1740, the electronic device performs charging by using non-restricted power sources. For example, if determining that wireless charging has a lower charging efficiency, the electronic device may restrict wireless charging.

Figure 18:
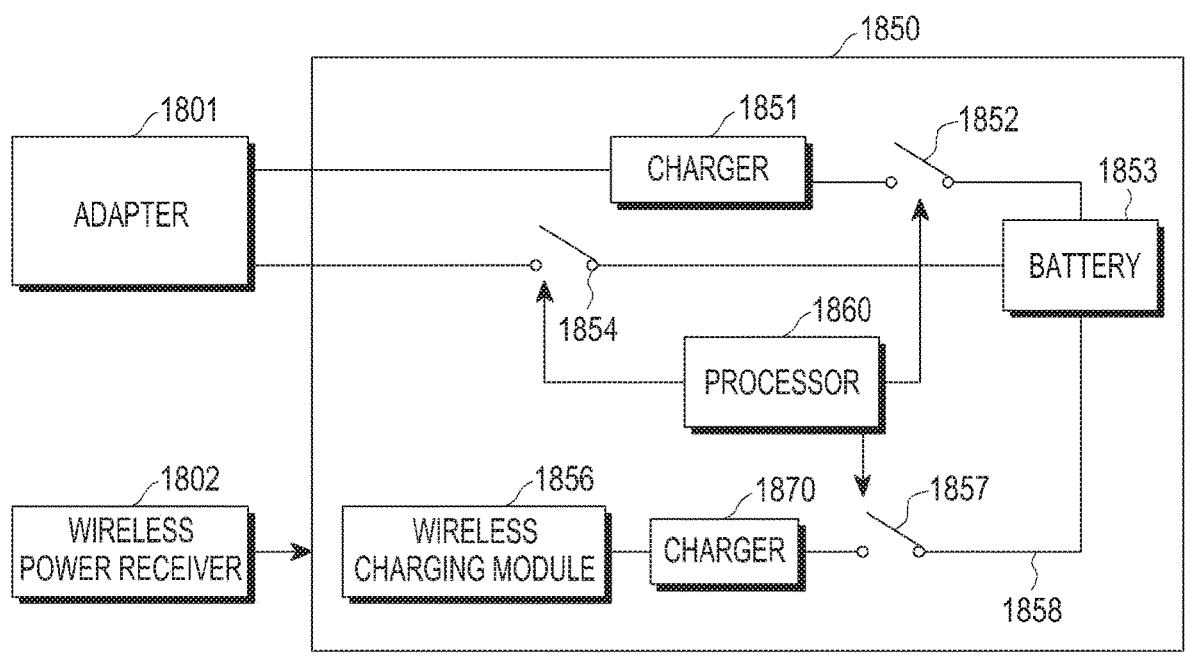
FIG. 18 is a block diagram of an electronic device according to various embodiments of the present disclosure.

FIG. 18 is a block diagram of an electronic device according to various embodiments of the present disclosure.

Referring to FIG. 18, an electronic device 1850 performs wired/wireless charging from an adapter 1801 and a wireless power transmitter 1802. The adapter 1801 according to various embodiments of the present disclosure provides power through a plurality of paths, and for example, may provide power of a first voltage through a first path connected to a charger 1851 and provide power processed suitably for charging of a battery 1853 through a second path. The electronic device 1850 may include a switch 1852 capable of opening/closing between the charger 1851 and the battery 1853.

The electronic device 1850 may include a wireless charging module 1856 that wirelessly receives power from the wireless power transmitter 1802 and performs rectification, conversion, etc., to output the processed power. The electronic device 1850 may further include a switch 1857 capable of opening/closing the path 1858 between the wireless charging module 1856 and the battery 1853.

A processor 1860 controls at least one on/off among switches 1852, 1854, and 1857 to perform optimal charging. For example, when fast charging is performed, the processor 1860 performs charging by controlling the switches 1852, 1854, and 1857 to be in the on state, and if detecting that the temperature of the battery 1853 exceeds a preset threshold value, the processor 1860 may control at least one of the switches 1852, 1854, or 1857 to be in the off state. In this case, the electronic device may determine a switch which is to be controlled to be in the off state, by calculating a charging efficiency for each path. If controlling the switch 1857 to be in the on state, the processor 1860 processes power received by the wireless charging module 1856 into a DC form and outputs the DC power to a charger 1870 which then adjusts the input power suitably for charging of the battery 1853 and provides the adjusted power to the battery 1853.

Figure 19:
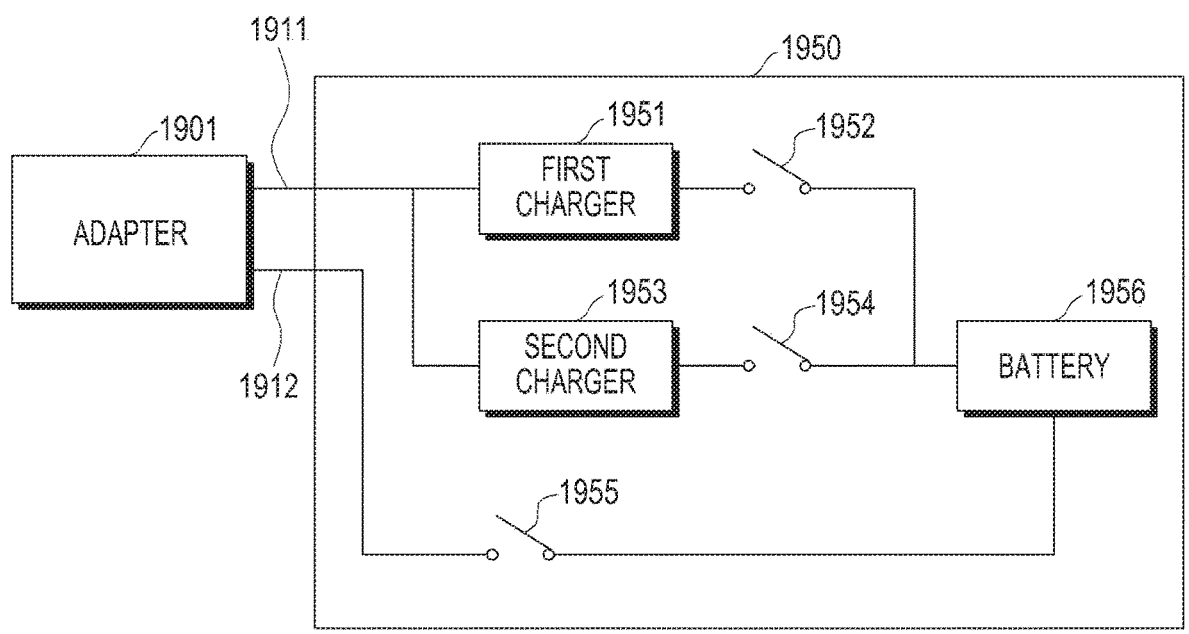
FIG. 19 is a block diagram of an electronic device according to various embodiments of the present disclosure.

FIG. 19 is a block diagram of an electronic device according to various embodiments of the present disclosure.

Referring to FIG. 19, an electronic device 1950 may include a charger 1951, a second charger 1953, and a battery 1956. An adapter 1901 may be connected to the first charger 1951 and the second charger 1953 through a first path 1911.

A switch 1952 is interposed between the first charger 1951 and the battery 1956, a switch 1954 is interposed between the second charger 1953 and the battery 1956, and a switch 1955 is interposed between a second path 1912 from a charger of the adapter 1901 and the battery 1956.

Figure 20:
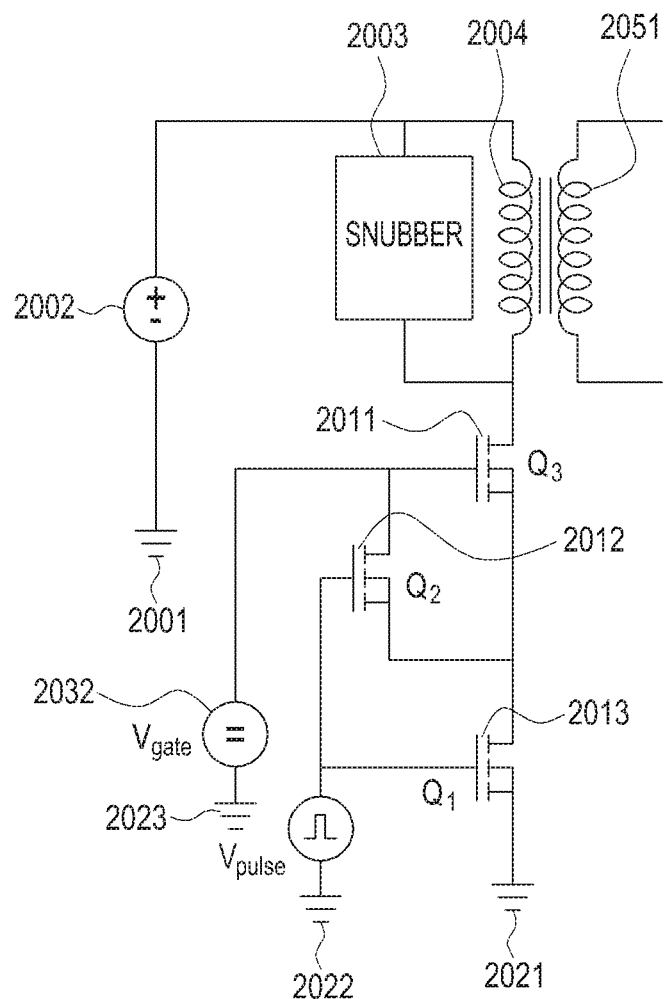
FIG. 20 is a circuit diagram for describing transformation according to various embodiments of the present disclosure.

FIG. 20 is a circuit diagram for describing transformation according to various embodiments of the present disclosure. At least a part of a circuit for transformation in FIG. 20 may be included in a transformer of an adapter.

A power source 2002 generates and outputs power of a DC waveform. A terminal of the power source 2002 is connected to a ground 2001. A snubber 2003 temporarily stores power from the power source 2002 and outputs the power to a primary side coil 2004. The primary side coil 2004 generates an induced magnetic field according to electromagnetic induction, and generates an induced electromotive force in a secondary side coil 2051 by an induced magnetic field. To generate the induced magnetic field in the primary side coil 2004, power whose level is changed like an AC waveform needs to be applied to the primary side coil 2004. A third switch 2011 is periodically turned on/off, such that power whose level changes over time such as an AC waveform may be applied to the primary side coil 2004.

The third switch 2011 is used during delivery from the primary side coil 2004 to the secondary side coil 2051, such that the third switch 2011 needs to be implemented as a high-capacity switch. However, as the capacity of the third switch 2011 increases, an on/off period may be relatively long. When the third switch 2011 is implemented with a high-capacity metal oxide semiconductor field effect transistor (MOSFET), the on/off period may have, for example, an order of kHz. As the on/off period of the third switch 2011 is longer, the frequency of the AC waveform applied to the primary side coil 2004 or the frequency of the induced magnetic field generated from the primary side coil 2004 may be low. Thus, when the third switch 2011 performs DC-DC conversion alone, the AC waveform of the low frequency needs to be processed. Since an overall level of the transformer including the primary side coil 2004 and the secondary side coil 2051 is inversely proportional to a frequency to be processed, an overall level of the adapter increases as the AC waveform of the low frequency is processed. This results from a feature that flux of a magnetic field is proportional to a product of an area and a strength of the magnetic field. When an AC waveform of a high frequency is processed, a level such as RMS delivered per unit time may be high as a magnetic field is changed in a short period, such that an area required for delivering predetermined flux may be small. Moreover, when an AC waveform of a high frequency is processed, a charge quantity received in the snubber 2003 may be set smaller, such that a level of the snubber 2003 may also be set low.

As a result, to reduce an overall level of the adapter, the third switch 2011 needs to operate at a high frequency. A circuit for transformation according to various embodiments of the present disclosure may further include additional switches 2012 and 2013 for forcing an on/off period of the high-capacity third switch 2011 to be short. The additional switches 2012 and 2013 may be implemented with low-capacity, for example, RF switches, and thus may have short on/off periods, e.g., an order of MHz.

First, a process of controlling the third switch 2011 to be in the on state will be described. In this case, a power source 2032 may apply a gate voltage to the third switch 2011. The power source 2032 may generate the gate voltage for controlling the third switch 2011 to be in the on state, and a terminal of which may be connected to a ground 2023. The first switch 2013 is connected to the second switch 2012, third switch 2011, and a ground 2021. The first switch 2013 may be controlled to be in the on state. The power source 2031 may output a signal for controlling the first switch 2013 to be in the on state to a gate of the first switch 2013. A terminal of the power source 2031 is connected to a ground 2022. The second switch 2012 may be controlled to be in the off state. The power source 2031 may output a signal for controlling the second switch 2012 to be in the off state to a gate of the second switch 2013. In various embodiments of the present disclosure, the power source 2031 outputs two signals to the first switch 2013 and the second switch 2012. An inversion circuit is included in a gate of any one of the first switch 2013 and the second switch 2012, such that the on/off states of the first switch 2013 and the second switch 2012 may be controlled to be inverse to each other. In this way, the third switch 2011 may be controlled to be in the on state.

Next, a process of controlling the third switch 2011 to be in the off state will be described. Although the third switch 2011 needs to be controlled in the off state, the third switch 2011 may be maintained in the on state due to a slow response. A circuit for transformation according to various embodiments of the present disclosure may forcibly control the third switch 2011 still in the on state due to the slow response to be in the off state. A circuit for transformation according to various embodiments of the present disclosure may control the second switch 2012 to be in the on state. When the second switch 2012 is in the on state, a gate of the third switch 2011 and a source of the third switch 2011 may be short-circuited. Thus, the third switch 2011 may be forcibly controlled to be in the off state. In this case, the switch 2013 may be controlled in the off state.

As such, since the third switch 2011 may be forcibly turned off, the on/off switchover of the third switch 2011 may be possible in the on/off period of the second switch 2012. As a result, an AC waveform processed in the primary side coil 2004 may operate at a high frequency, thereby reducing an overall level of the adapter.

According to various embodiments of the present disclosure, an electronic device and a method for controlling the same may be provided, in which a battery is charged by a plurality of chargers or using methods other than the charger, thereby reducing a heat emission quantity of the charger. Therefore, by reducing heat emission generated in the charger, degradation of a product may be prevented without lowering a charging efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for charging a battery, the electronic device comprising: a first path configured to receive a first power of a first voltage from an adapter;
    a second path configured to receive a second power of a second voltage from the adapter; a charger, connected to the first path, configured to: receive the first power, adjust at least one of a voltage or a current of the first power, and provide the adjusted first power to the battery; and a processor configured to control to connect the second path to the battery during fast charging to directly connect the battery to the adapter, wherein, when adjusting the at least one of the voltage or the current of the first power and connecting the second path to the battery, the processor is further configured to: determine a first level of a first current corresponding to the first path and a second level of a second current corresponding to the second path based on a first efficiency of the first path related to charging the battery and a second efficiency of the second path related to charging the battery
    calculate the first efficiency of the first path by using a current and a voltage at an input terminal of the first path and a current and a voltage at an output terminal of the first path,
    calculate the second efficiency of the second path by using a current and a voltage at an input terminal of the second path and a current and a voltage at an output terminal of the second path, calculate an overall efficiency by using the first efficiency of the first path and the second efficiency of the second path, and determine the first level of the first current corresponding to the first path and the second level of the second current corresponding to the second path such that the overall efficiency is an optimal efficiency.

2. The electronic device of claim 1, further comprising a switch for opening or closing a connection between the second path and the adapter,
    wherein the processor is further configured to control to directly connect the adapter to the battery by controlling the switch to be in an on state during the fast charging.

3. The electronic device of claim 2, wherein the processor is further configured to control to open the switch between the adapter and the battery by controlling the switch to be in an off state during normal charging.

4. The electronic device of claim 1, wherein the processor is further configured to control the second path to be disconnected from the battery if a fast charging release condition is detected during the fast charging.

5. The electronic device of claim 4, wherein the fast charging release condition is related to at least one of a voltage, a current, a remaining power capacity, or a temperature of the battery.

6. The electronic device of claim 1,
    wherein the first path is a power lane of a universal serial bus (USB)-micro B type or a power lane of a USB-C type, and
    wherein the second path is a data lane of a USB-micro B type or a data lane of a USB-C type.

7. The electronic device of claim 6, wherein the processor is further configured to control to directly connect the adapter to the battery by connecting the second path to the battery after transmitting a fast charging signal to the adapter through the second path.

8. The electronic device of claim 6, wherein the processor is further configured to control to transmit a fast charging release signal to the adapter through the second path by controlling the second path to be disconnected from the battery, if a fast charging release condition is detected.

9. The electronic device of claim 1,
    wherein the second path is connected to a charger of the adapter, and
    wherein the charger of the adapter is configured to:
        adjust input power to the second power of the second voltage, and
        provide the second power of the second voltage through the second path.

10. An electronic device for charging a battery, the electronic device comprising:

a first charger configured to receive a first power from an external power source;

a second charger configured to receive a second power from the external power source; and a processor configured to:

control to determine an overall level of a current for charging the battery, control to determine a first level of a first current corresponding to the first charger and a second level of a second current corresponding to the second charger based on a first efficiency of the first charger related to charging the battery and a second efficiency of the second charger related to charging the battery, control the first charger to receive the first current of the first level, and control the second charger to receive the second current of the second level, wherein the processor is further configured to control to:

calculate the first efficiency of the first charger by using a current and a voltage at an input terminal of the first charger and a current and a voltage at an output terminal of the first charger, calculate the second efficiency of the second charger by using a current and a voltage at an input terminal of the second charger and a current and a voltage at an output terminal of the second charger, calculate an overall efficiency by using the first efficiency of the first charger and the second efficiency of the second charger, and determine the first level of the first current corresponding to the first charger and the second level of the second current corresponding to the second charger such that the overall efficiency is an optimal efficiency.

11. The electronic device of claim 10, wherein the processor is further configured to control to change the first level of the first current corresponding to the first charger and the second level of the second current corresponding to the second charger until the overall efficiency has a highest value of efficiency.

12. The electronic device of claim 10, wherein the processor is further configured to control to determine the first level of the first current corresponding to the first charger and the second level of the second current corresponding to the second charger, by using a previously stored relationship between an input current and the first efficiency of the first charger and a previously stored relationship between an input current and the second efficiency of the second charger.

* * * * *